US007009179B2

(12) United States Patent
Nihei

(10) Patent No.: US 7,009,179 B2
(45) Date of Patent: Mar. 7, 2006

(54) METHOD AND APPARATUS FOR DISPLAYING IMAGE BY PRODUCING POLARIZATION INVERSION IN FERROELECTRIC MEMBER AND PRODUCING CONTRAST IN CONTRAST PRODUCTION MEMBER

(75) Inventor: Yasukazu Nihei, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 382 days.

(21) Appl. No.: 10/025,855

(22) Filed: Dec. 26, 2001

(65) Prior Publication Data
US 2002/0080290 A1    Jun. 27, 2002

(30) Foreign Application Priority Data
Dec. 25, 2000    (JP) ............................. 2000-392707

(51) Int. Cl.
G03G 5/16    (2006.01)
(52) U.S. Cl. ...................... 250/316.1; 430/51; 430/66
(58) Field of Classification Search ............. 250/316.1; 430/51, 66, 84, 95; 347/114; 427/466
See application file for complete search history.

(56) References Cited

U.S. PATENT DOCUMENTS

| 5,079,200 A | * | 1/1992 | Jackson | ...................... 501/136 |
| 5,927,206 A | * | 7/1999 | Bacon et al. | ............... 101/453 |
| 6,177,968 B1 | * | 1/2001 | Okada et al. | ................. 349/38 |
| 6,512,912 B1 | * | 1/2003 | Kamei et al. | ............... 399/313 |

FOREIGN PATENT DOCUMENTS

JP    8-146457    6/1996

OTHER PUBLICATIONS

Abstract 08-146457, Jun. 7, 1996.

\* cited by examiner

*Primary Examiner*—John R. Lee
*Assistant Examiner*—Paul M. Gurzo
(74) *Attorney, Agent, or Firm*—Sughrue Mion, PLLC

(57) ABSTRACT

In a method for displaying an image: a polarization inversion pattern is produced in a ferroelectric member in accordance with image information so as to produce a surface charge pattern corresponding to the polarization inversion pattern; and an image contrast is produced in a contrast production member by the influence of the surface charge pattern, where the contrast production member is joined to the ferroelectric member. The polarization inversion pattern may be produced by heating the ferroelectric member so as to produce a heat distribution corresponding to the image information in the ferroelectric member. Further, the ferroelectric member may be heated by applying infrared light carrying the image information to the ferroelectric member.

58 Claims, 9 Drawing Sheets

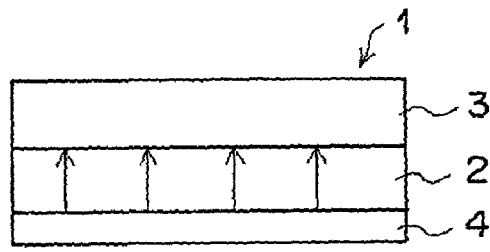
F I G. 1A
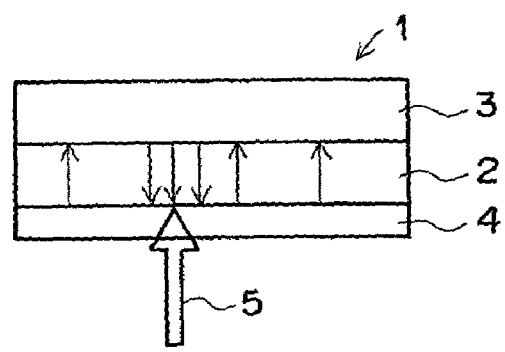
F I G. 1B
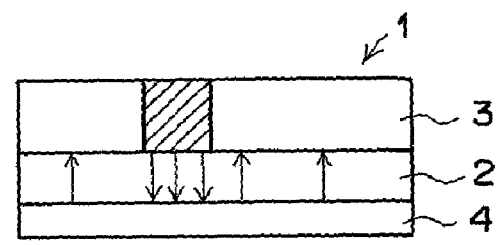
F I G. 1C
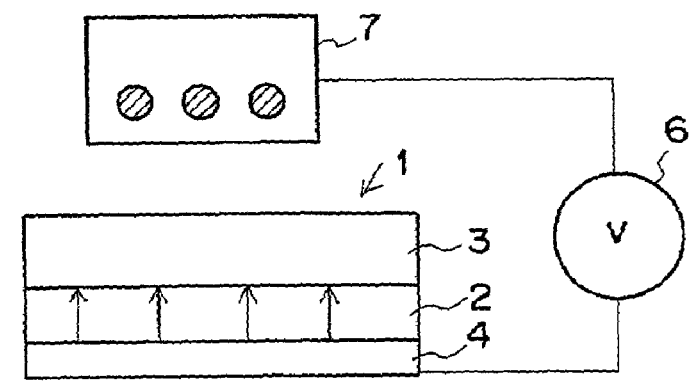
F I G. 1D

F I G. 4
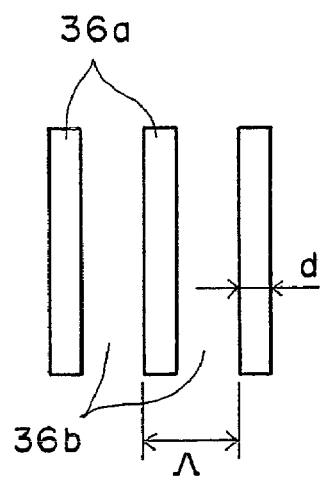
F I G. 5
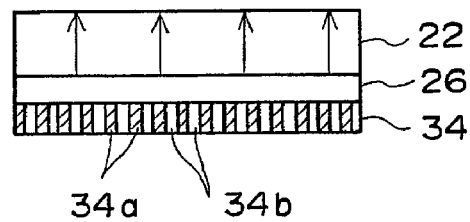
F I G. 6A
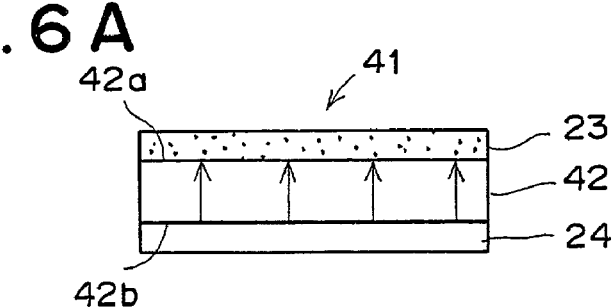
F I G. 6B
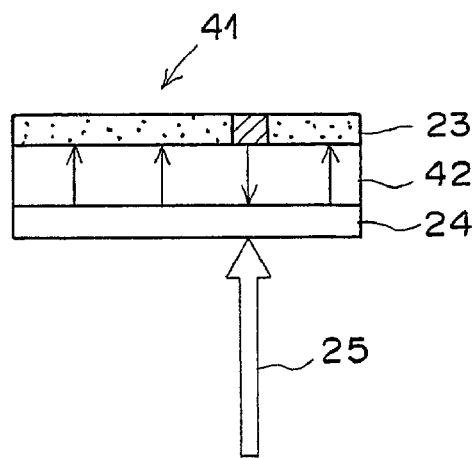

F I G . 7A
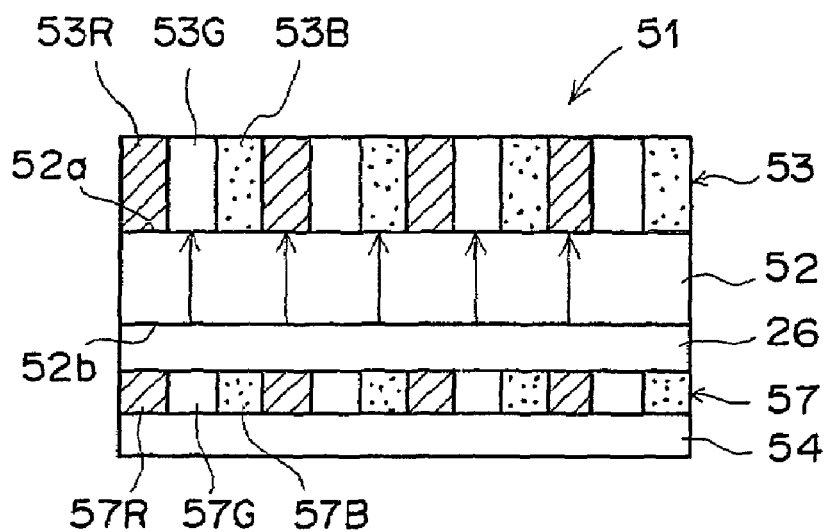
F I G . 7B
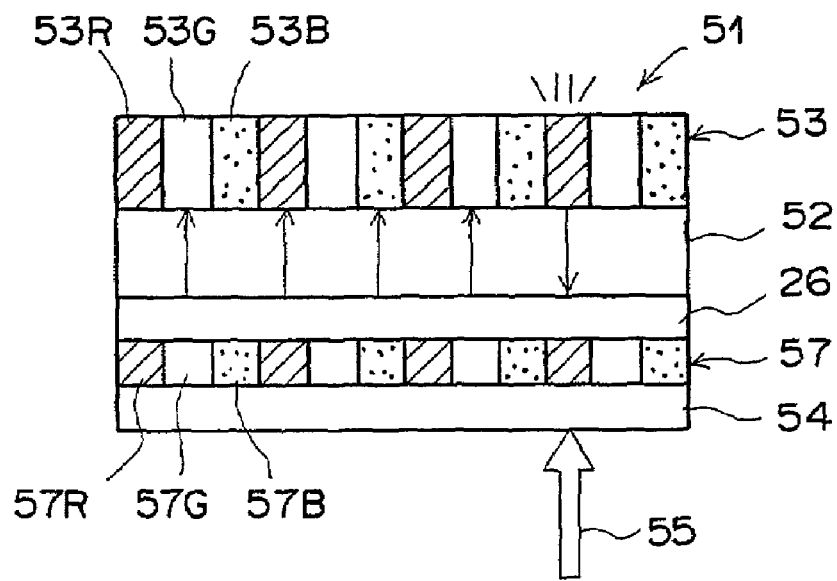

METHOD AND APPARATUS FOR DISPLAYING IMAGE BY PRODUCING POLARIZATION INVERSION IN FERROELECTRIC MEMBER AND PRODUCING CONTRAST IN CONTRAST PRODUCTION MEMBER

BACKGROUND OF THE INVENTION

1. Field of the Invention

The present invention relates to a method for displaying an image by using a ferroelectric material. In addition, the present invention relates to an apparatus for executing the above method. Further, the present invention relates to an image display medium which is used in the method.

2. Description of the Related Art

The liquid crystal display apparatus is one of the currently known image display apparatuses. In most of the liquid crystal display apparatuses currently used, a display signal applied to each pixel is updated at a predetermined frame frequency, e.g., 60 Hz. When an image display apparatus is driven in this manner, a voltage is required to be continuously applied to each pixel even when a still image is displayed. Therefore, the above manner of driving an image display apparatus is disadvantageous for reduction of energy consumption.

In order to solve the above problem, a liquid crystal display apparatus having an image holding function has been proposed, for example, by Japanese patent application, No. 6(1994)-312357 corresponding to Japanese Unexamined Patent Publication No. 8(1996)-146457. In this liquid crystal display apparatus, a ferroelectric material is series-connected to a pixel electrode which applies a voltage to a portion of a liquid crystal layer corresponding to each pixel, and the voltage is applied to the portion of the liquid crystal layer by the action of polarization charges, which are generated by applying a voltage to the ferroelectric material so as to cause polarization inversion. Since the state of the polarization inversion is maintained in the above construction, a desired voltage can be continuously applied to each portion of the liquid crystal layer corresponding to each pixel. Thus, a liquid crystal display apparatus having an image holding function is realized.

However, in the above liquid crystal display apparatus, an image is basically displayed by using a liquid crystal panel, which is expensive. Further, an expensive electric circuit is necessary for controlling the voltage application to the liquid crystal panel for each pixel. Therefore, manufacturing cost is high.

SUMMARY OF THE INVENTION

An object of the present invention is to provide a method for displaying an image by using an inexpensive arrangement in such a manner that the displayed image is maintained without application of a voltage.

Another object of the present invention is to provide an apparatus which is inexpensive and can display an image in such a manner that the displayed image is maintained without application of a voltage.

A further object of the present invention is to provide an image display medium on which an image can be displayed by using an inexpensive arrangement in such a manner that the displayed image is maintained without application of a voltage.

(I) According to the first aspect of the present invention, there is provided a method for displaying an image, comprising the steps of: (a) producing a polarization inversion pattern in a ferroelectric member in accordance with image information so as to produce a surface charge pattern corresponding to the polarization inversion pattern; and (b) producing an image contrast in a contrast production member by the influence of the surface charge pattern, where the contrast production member is joined to the ferroelectric member.

Preferably, the method according to the first aspect of the present invention also has one or any possible combination of the following additional features (1) to (18).

(1) The polarization inversion pattern may be produced by heating the ferroelectric member so as to produce a heat distribution corresponding to the image information in the ferroelectric member.

(2) In the method according to the first aspect of the present invention having the feature (1), the ferroelectric member may be heated by applying infrared light carrying the image information to the ferroelectric member.

(3) In the method according to the first aspect of the present invention having the feature (2): the infrared light may include three types of infrared light having three different wavelengths and carrying three pieces of image information representing three different color components of the image, respectively; and the infrared light may be applied to the ferroelectric member through a wavelength-selective transparent film. In this case, a plurality of light-to-heat conversion elements of each of three types, which are selectively transparent to one of the three types of infrared light, may be periodically arranged in a plurality of first predetermined positions in the wavelength-selective transparent film. In addition, a plurality of color-formation elements of each of three types, which form a color for one of the three different color components, may be periodically arranged in a plurality of second predetermined positions corresponding to the plurality of first predetermined positions in the contrast production member.

(4) In the method according to the first aspect of the present invention having the feature (1), the ferroelectric member may be heated by applying infrared light carrying the image information to a light-to-heat conversion member which is arranged in close proximity to or in contact with the ferroelectric member, where the light-to-heat conversion member absorbs the infrared light.

(5) In the method according to the first aspect of the present invention having the feature (4); the infrared light may include three types of infrared light having three different wavelengths and carrying three pieces of image information representing three different color components of the image, respectively. In this case, a plurality of light-to-heat conversion elements of each of three types, which selectively absorb one of the three types of infrared light and convert the one of the three types of infrared light into heat, may be periodically arranged in a plurality of first predetermined positions in the light-to-heat conversion member. In addition, a plurality of color-formation elements of each of three types, which form a color for one of the three different color components, may be periodically arranged in a plurality of second predetermined positions corresponding to the plurality of first predetermined positions in the contrast production member.

(6) In the step (a), a bias voltage may be applied to the ferroelectric member through a transparent conductive film which is arranged on one side of the ferromagnetic member.

(7) In the method according to the first aspect of the present invention having the feature (6), the transparent conductive film may include a plurality of conductive portions and a plurality of non-conductive portions intermingled with the plurality of conductive portions, where the plurality of conductive portions and the plurality of non-conductive portions are small in size.

(8) In the method according to the first aspect of the present invention having the feature (7), the plurality of conductive portions and the plurality of non-conductive portions may be alternately arranged at predetermined intervals.

(9). In the method according to the first aspect of the present invention having the feature (6), the transparent conductive film may be transparent to infrared light. On the other hand, in the case where the light-to-heat conversion film is used, a nontransparent conductive film such as a metal thin film may be used instead of the transparent conductive film.

(10) In the method according to the first aspect of the present invention having the feature (4), the light-to-heat conversion member may include a plurality of light-to-heat conversion portions and a plurality of non-conversion portions intermingled with the plurality of small light-to-heat conversion portions, where the plurality of light-to-heat conversion portions and the plurality of non-conversion portions are small in size.

(11) In the method according to the first aspect of the present invention having the feature (10), the plurality of light-to-heat conversion portions and the plurality of non-conversion portions may be alternately arranged at predetermined intervals.

(12) The contrast production member may be constituted by a base in which charged particles are dispersed. For example, the contrast production member may be a charged-particle sheet in which charged particles are dispersed.

(13) The contrast production member may be made of an electrochromic material. The electrochromic material is a material which reversibly change its optical absorption spectrum (i.e., a color tone or hue) by electrochemical oxidation-reduction reactions (i.e., injection or removal of electrons). Preferably, the electrochromic material is a conductive polymer (organic electrochromic material) such as polyaniline, polypyrrole, or polythiophene, or an inorganic electrochromic material such as tungsten oxide or molybdenum oxide.

(14) The ferroelectric member may be made of an inorganic ferroelectric oxide.

(15) In the method according to the first aspect of the present invention having the feature (14), the ferroelectric member may have a form of a thin film, and the inorganic ferroelectric oxide may be made from metal alkoxides.

(16) In the method according to the first aspect of the present invention having the feature (14), the inorganic ferroelectric oxide may be $LiNb_xTa_{1-x}O_3$, where $0 \leq x \leq 1$.

(17) In the method according to the first aspect of the present invention having the feature (2), the ferroelectric member may be doped with a dopant which absorbs the infrared light.

(18) In the method according to the first aspect of the present invention having the feature (17), the dopant may contain at least one of Mg, Ti, Cr, Ni, Cu, Zn, Zr, Nb, Mo, Rh, Ag, In, Sn, Au, and Pb.

(II) According to the second aspect of the present invention, there is provided an apparatus for displaying an image, comprising: a ferroelectric member in which a polarization inversion pattern is produced in accordance with image information so as to produce a surface charge pattern corresponding to the polarization inversion pattern; and a contrast production member which is joined to the ferroelectric member, and in which an image contrast is produced by the influence of the surface charge pattern.

Preferably, the apparatus according to the second aspect of the present invention also has one or any possible combination of the following additional features (19) to (36).

(19) The polarization inversion pattern may be produced by heating the ferroelectric member so as to produce a heat distribution corresponding to the image information in the ferroelectric member.

(20) In the apparatus according to the second aspect of the present invention having the feature (19), the ferroelectric member may be heated by applying infrared light carrying the image information to the ferroelectric member.

(21) The apparatus according to the second aspect of the present invention having the feature (20) may further comprise a wavelength-selective transparent film; wherein the infrared light includes three types of infrared light having three different wavelengths and carrying three pieces of image information representing three different color components of the image, respectively; and the infrared light may be applied to the ferroelectric member through the wavelength-selective transparent film. In this case, a plurality of light-to-heat conversion elements of each of three types, which are selectively transparent to one of the three types of infrared light, may be periodically arranged in a plurality of first predetermined positions in the wavelength-selective transparent film; and a plurality of color-formation elements of each of three types, which form a color for one of the three different color components, may be periodically arranged in a plurality of second predetermined positions corresponding to the plurality of first predetermined positions in the contrast production member.

(22) The apparatus according to the second aspect of the present invention having the feature (19) may further comprise a light-to-heat conversion member and a light application unit. The light-to-heat conversion member is arranged in close proximity to or in contact with the ferroelectric member, absorbs the infrared light, and converts the infrared light into heat. The light application unit applies the infrared light to the light-to-heat conversion member.

(23) In the apparatus according to the second aspect of the present invention having the feature (22), the infrared light may include three types of infrared light having three different wavelengths and carrying three pieces of image information representing three different color components of the image, respectively. In this case, a plurality of light-to-heat conversion elements of each of three types, which selectively absorb one of the three types of infrared light and convert the one of the three types of infrared light into heat, may be periodically arranged in a plurality of first predetermined positions in the light-to-heat conversion member, and a plurality of color-formation elements of each of three types, which form a color for one of the three different color components, may be periodically arranged in a plurality of second predetermined positions corresponding to the plurality of first predetermined positions in the contrast production member.

(24) The apparatus according to the second aspect of the present invention having the feature (18) may further comprise a transparent conductive film which is arranged on one side of the ferromagnetic member, and a bias-voltage application unit which applies a bias voltage to the ferroelectric member through the transparent conductive film.

(25) In the apparatus according to the second aspect of the present invention having the feature (24), the transparent conductive film may include a plurality of conductive portions and a plurality of non-conductive portions intermingled with the plurality of conductive portions, where the plurality of conductive portions and the plurality of non-conductive portions are small in size.

(26) In the apparatus according to the second aspect of the present invention having the feature (25), the plurality of conductive portions and the plurality of non-conductive portions may be alternately arranged at predetermined intervals.

(27) In the apparatus according to the second aspect of the present invention having the feature (24), the transparent conductive film may be transparent to infrared light.

(28) In the apparatus according to the second aspect of the present invention having the feature (22), the light-to-heat conversion member may include a plurality of light-to-heat conversion portions and a plurality of non-conversion portions intermingled with the plurality of small light-to-heat conversion portions, where the plurality of light-to-heat conversion portions and the plurality of non-conversion portions are small in size.

(29) In the apparatus according to the second aspect of the present invention having the feature (28), the plurality of light-to-heat conversion portions and the plurality of non-conversion portions may be alternately arranged at predetermined intervals.

(30) In the apparatus according to the second aspect of the present invention having the feature (18), the contrast production member may be constituted by a base in which charged particles are dispersed.

(31) In the apparatus according to the second aspect of the present invention having the feature (18), the contrast production member may be made of an electrochromic material.

(32) In the apparatus according to the second aspect of the present invention having the feature (18), the ferroelectric member may be made of an inorganic ferroelectric oxide.

(33) In the apparatus according to the second aspect of the present invention having the feature (32), the ferroelectric member may have a form of a thin film, and the inorganic ferroelectric oxide may be made from metal alkoxides.

(34) In the apparatus according to the second aspect of the present invention having the feature (32), the inorganic ferroelectric oxide may be $LiNb_xTa_{1-x}O_3$, where $0 \leq x \leq 1$.

(35) In the apparatus according to the second aspect of the present invention having the feature (20), the ferroelectric member may be doped with a dopant which absorbs the infrared light.

(36) In the apparatus according to the second aspect of the present invention having the feature (35), the dopant may contain at least one of Mg, Ti, Cr, Ni, Cu, Zn, Zr, Nb, Mo, Rh, Ag, In, Sn, Au, and Pb.

(III) According to the third aspect of the present invention, there is provided an image display medium for use in displaying an image, comprising: a ferroelectric member in which a polarization inversion pattern is produced in accordance with image information so as to produce a surface charge pattern corresponding to the polarization inversion pattern; and a contrast production member which is joined to the ferroelectric member, and in which an image contrast is produced by the influence of the surface charge pattern.

Preferably, the image display medium according to the third aspect of the present invention also has one or any possible combination of the following additional features (37) to (52).

(37) The ferroelectric member may be doped with a dopant which absorbs the infrared light.

(38) In the image display medium according to the third aspect of the present invention having the feature (37), the dopant may contain at least one of Mg, Ti, Cr, Ni, Cu, Zn, Zr, Nb, Mo, Rh, Ag, In, Sn, Au, and Pb.

(39) The image display medium according to the third aspect of the present invention having the feature (36) may further comprise a light-to-heat conversion member which has a form of a layer, is arranged in close proximity to or in contact with the ferroelectric member, absorbs the infrared light, and converts the infrared light into heat so that the heat is transferred to the ferroelectric member.

(40) In the image display medium according to the third aspect of the present invention having the feature (39), the light-to-heat conversion member may include a plurality of light-to-heat conversion portions and a plurality of non-conversion portions intermingled with the plurality of small light-to-heat conversion portions, where the plurality of light-to-heat conversion portions and the plurality of non-conversion portions are small in size.

(41) In the image display medium according to the third aspect of the present invention having the feature (40), the plurality of light-to-heat conversion portions and the plurality of non-conversion portions may be alternately arranged at predetermined intervals.

(42) In the image display medium according to the third aspect of the present invention having the feature (36), the ferroelectric member may be made of an inorganic ferroelectric oxide.

(43) In the image display medium according to the third aspect of the present invention having the feature (42), the ferroelectric member may have a form of a thin film, and the inorganic ferroelectric oxide may be made from metal alkoxides.

(44) In the image display medium according to the third aspect of the present invention having the feature (42), the inorganic ferroelectric oxide may be $LiNb_xTa_{1-x}O_3$, where $0 \leq x \leq 1$.

(45) the image display medium according to the third aspect of the present invention having the feature (36) may further comprise a transparent conductive film which is arranged on one side of the ferromagnetic member. For example, the transparent conductive film may be formed corresponding to the entire surface of the ferroelectric member.

(46) In the image display medium according to the third aspect of the present invention having the feature (45), the transparent conductive film may include a plurality of conductive portions and a plurality of non-conductive portions intermingled with the plurality of conductive portions, where the plurality of conductive portions and the plurality of non-conductive portions are small in size.

(47) In the image display medium according to the third aspect of the present invention having the feature (46), the plurality of conductive portions and the plurality of non-conductive portions may be alternately arranged at predetermined intervals.

(48) In the image display medium according to the third aspect of the present invention having the feature (48), the transparent conductive film may be transparent to infrared light.

(49) In the image display medium according to the third aspect of the present invention having the feature (36), the contrast production member may be constituted by a base in which charged particles are dispersed.

(50) In the image display medium according to the third aspect of the present invention having the feature (36), the contrast production member may be made of an electrochromic material.

(51) In the image display medium according to the third aspect of the present invention having the feature (36), the image display medium according to the third aspect of the present invention may further comprise a wavelength-selective transparent film for the case where the image is constituted by three different color components. In this case, a plurality of light-to-heat conversion elements of each of three types, which are selectively transparent to one of three types of infrared light respectively having three different wavelengths, may be periodically arranged in a plurality of first predetermined positions in the wavelength-selective transparent film, and a plurality of color-formation elements of each of three types, which form a color for one of the three different color components, may be periodically arranged in a plurality of second predetermined positions corresponding to the plurality of first predetermined positions in the contrast production member.

(52) In the image display medium according to the third aspect of the present invention having the feature (36), the image may be constituted by three different color components. In this case, a plurality of light-to-heat conversion elements of each of three types, which selectively absorb one of three types of infrared light and convert the one of the three types of infrared light into heat, may be periodically arranged in a plurality of first predetermined positions in the light-to-heat conversion member, and a plurality of color-formation elements of each of three types, which form a color for one of the three different color components, may be periodically arranged in a plurality of second predetermined positions corresponding to the plurality of first predetermined positions in the contrast production member.

(IV) The advantages of the present invention are as follows.

(a) According to the present invention, a distribution of polarization inversion in the ferroelectric member is controlled without complex driver circuitry which controls voltages applied to respective pixels, since the distribution of polarization inversion in the ferroelectric member can be controlled, for example, by application of infrared light carrying image information. Therefore, an image can be displayed by using an inexpensive arrangement in the manner that the displayed image is maintained without application of an electric voltage.

(b) The inorganic ferroelectric oxides exhibits much higher heat durability than the organic polymer materials such as polyvinylidene fluoride. Therefore, when the ferroelectric member is made of an inorganic ferroelectric oxide, reliable image display is realized.

(c) In the case where infrared light carrying image information is applied to the ferroelectric member in order to realize a heat distribution corresponding to the image information in the ferroelectric member, it is advantageous to dope the ferroelectric member with a dopant which absorbs the infrared light, because the ferroelectric member doped with such a dopant can efficiently absorb the infrared light, and realize precise image display corresponding to the image information.

(d) When a light-to-heat conversion member which has a form of a layer, absorbs the infrared light, and converts the infrared light into heat so that the heat is transferred to the ferroelectric member is arranged in close proximity to or in contact with the ferroelectric member, the heat generated by the conversion from the infrared light can be efficiently absorbed by the ferroelectric member. Therefore, an image corresponding to the image information can be precisely displayed.

(e) When the light-to-heat conversion member includes a plurality of small light-to-heat conversion portions and a plurality of small non-conversion portions intermingled with the plurality of small light-to-heat conversion portions (in particular, when the plurality of light-to-heat conversion portions and the plurality of non-conversion portions are alternately arranged at predetermined intervals), surface charges of regions of the ferroelectric member in which polarization inversion occurs and surface charges of adjacent regions of the ferroelectric member in which polarization inversion does not occur cancel out each other, and therefore the amount of surface charges can be controlled. For example, when the mixed ratio of the light-to-heat conversion portions and the non-conversion portions is 1:1, the amount of surface charges becomes nearly zero.

That is, while the surface charge distribution in the monopolarized state is maintained in regions of the ferroelectric member under areas of the light-to-heat conversion member to which the infrared light is not applied, the amount of surface charges in regions of the ferroelectric member under areas of the light-to-heat conversion member to which the infrared light is applied becomes nearly zero. For example, when the contrast production member is made of an electrochromic material, the electrochromic phenomenon occurs in the regions of the contrast production member under the areas of the light-to-heat conversion member to which the infrared light is not applied, and does not occur in the regions of the contrast production member under the areas of the light-to-heat conversion member to which the infrared light is applied. Therefore, contrast is produced between the regions of the contrast production member under the areas of the light-to-heat conversion member to which the infrared light is not applied and the regions of the contrast production member under the areas of the light-to-heat conversion member to which the infrared light is applied. Thus, when the light-to-heat conversion member includes a plurality of small light-to-heat conversion portions and a plurality of small non-conversion portions intermingled with the plurality of small light-to-heat conversion portions, it is possible to use various types of contrast production members.

(f) When the periodically-transparent conductive film includes a plurality of small conductive portions and a plurality of small non-conductive portions intermingled with the plurality of small conductive portions (in particular, when the plurality of conductive portions and the plurality of non-conductive portions are alternately arranged at predetermined intervals), the polarization inversion is promoted by application of a bias voltage in regions of the ferroelectric member located corresponding to the conductive portions, and the polarization inversion is not promoted in regions of the ferroelectric member located corresponding to the non-conductive portions. Therefore, in each region of the ferroelectric member corresponding to an area of the image display medium to which the infrared light is applied, surface charges of small regions of the ferroelectric member in which polarization inversion occurs and surface charges of adjacent small regions of the ferroelectric member in which polarization inversion does not occur cancel out each other, and thus the amount of surface charges in the region of the ferroelectric member corresponding to the area of the image display medium to which the infrared light is applied can be controlled. For example, in the case where the mixed ratio of the conductive portions and the non-conductive portions is 1:1, the amount of surface charges becomes nearly zero when the bias voltage is applied.

That is, while the surface charge distribution in the monopolarized state is maintained in regions of the ferroelectric member under areas of the image display medium to which the infrared light is not applied, the amount of surface charges in regions of the ferroelectric member under areas of the image display medium to which the infrared light is applied becomes nearly zero. For example, when the contrast production member is made of an electrochromic material, the electrochromic phenomenon occurs in the regions of the contrast production member corresponding to the areas of the image display medium to which the infrared light is not applied, and does not occur in the regions of the contrast production member corresponding to the areas of the image display medium to which the infrared light is applied. Therefore, contrast is produced between the regions of the contrast production member corresponding to the areas of the image display medium to which the infrared light is not applied and the regions of the contrast production member corresponding to the areas of the image display medium to which the infrared light is applied. Thus, when the light-to-heat conversion member includes a plurality of small conductive portions and a plurality of small non-conductive portions intermingled with the plurality of small conductive portions, it is possible to use various types of contrast production members.

DESCRIPTION OF THE DRAWINGS

FIG. 1A is a diagram illustrating a cross section of a basic construction of the image display medium according to the third aspect of the present invention in a stage in which an electric field is applied to a ferroelectric member for monopolarization.

FIG. 1B is a diagram illustrating a cross section of the basic construction of the image display medium according to the third aspect of the present invention in a stage in which light carrying image information is applied to the ferroelectric member for polarization inversion.

FIG. 1C is a diagram illustrating a cross section of the basic construction of the image display medium according to the third aspect of the present invention in a stage in which a color is formed in a contrast production member corresponding to a charge distribution pattern produced by the polarization inversion in the ferroelectric member caused by the application of the light.

FIG. 1D is a diagram illustrating a cross section of the basic construction of the image display medium according to the third aspect of the present invention and an arrangement for resetting the direction of the polarization of the ferroelectric member by applying an electric field to the ferroelectric member.

FIG. 4 is an explanatory diagram illustrating a pitch and a width of light-to-heat conversion portions in a periodical light-to-heat conversion film in the image display medium of FIGS. 3A to 3D.

FIG. 5 is a diagram illustrating a cross section of a portion of an image display medium in a third embodiment of the present invention.

FIG. 6A is a diagram illustrating a cross section of the image display medium in a fifth embodiment of the present invention in a stage in which an electric field is applied to a doped LN thin film for monopolarization.

FIG. 6B is a diagram illustrating a cross section of the image display medium in the fifth embodiment of the present invention in a stage in which light carrying image information is applied to the doped LN thin film for polarization inversion.

FIG. 7A is a diagram illustrating a cross section of the image display medium in a sixth embodiment of the present invention in a stage in which an electric field is applied to a LN thin film for monopolarization.

FIG. 7B is a diagram illustrating a cross section of the image display medium in the sixth embodiment of the present invention in a stage in which light carrying image information is applied to the LN thin film for polarization inversion.

DESCRIPTION OF PREFERRED EMBODIMENTS

Figure 2A:
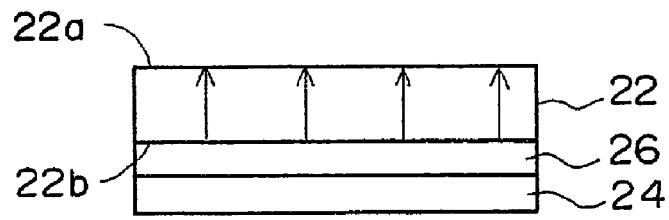
FIG. 2A is a diagram illustrating a cross section of a portion of an image display medium in a first embodiment of the present invention.

Embodiments of the present invention are explained in detail below with reference to drawings.

Basic Construction of the Present Invention

The basic construction and operations of the present invention are explained below with reference to FIGS. 1A to 1D, which show a cross section of the basic construction of the image display medium according to the third aspect of the present invention in three stages in a process for displaying an image according to the first aspect of the present invention.

In FIGS. 1A to 1D, reference numeral 1 denotes the image display medium, 2 denotes a ferroelectric member, 3 denotes a contrast production member, 4 denotes a transparent electrode, 5 denotes light, 6 denotes a DC power supply, and 7 denotes a corona head. For example, the ferroelectric member 2 is a ferroelectric thin film or a ferroelectric substrate.

In the image display medium 1, the ferroelectric member 2 is sandwiched between the contrast production member 3 and the transparent electrode 4, as illustrated in FIG. 1A. For example, the ferroelectric member 2 is formed on the transparent electrode 4, and the contrast production member 3 is joined to the exposed face of the ferroelectric member 2.

According to the first aspect of the present invention, an image is displayed by using the image display medium 1 as follows.

Before an image is displayed, monopolarization processing is performed on the ferroelectric member 2 (i.e., the image display medium 1 is reset) by applying an electric field to the ferroelectric member 2 as illustrated in FIG. 1A. In FIG. 1A, the arrows indicate the direction of polarization of the ferroelectric member 2.

Next, as illustrated in FIG. 1B, light 5 (e.g., infrared light) carrying image information is applied to the ferroelectric member 2 from the opposite side to the contrast production member 3. In order to make the light 5 carry the image information, for example, it is possible to modulate the light 5 and two-dimensionally scan the ferroelectric member 2 with the modulated light 5. When light having at least a predetermined intensity is applied to a region of the ferroelectric member 2, the region of the ferroelectric member 2 is so heated that the direction of the polarization in the region of the ferroelectric member 2 is inverted.

In the case where a threshold voltage for polarization inversion is high, a bias voltage may be applied to the entire area of the ferroelectric member 2. Alternatively, the threshold voltage may be lowered by raising the temperature of the ferroelectric member 2.

When the direction of the polarization in a region of the ferroelectric member 2 is inverted, the polarity of the surface charges produced at the boundary between the region of the ferroelectric member 2 and the contrast production member 3 is inverted. Therefore, a polarization inversion pattern is produced by the application of the light 5 carrying the image information to the ferroelectric member 2, and a charge distribution pattern corresponding to the polarization inversion pattern is produced at the boundary between the ferroelectric member 2 and the contrast production member 3 so that color formation corresponding to the charge distribution pattern (i.e., corresponding to the image information carried by the light 5) occurs in the contrast production member 3, as illustrated in FIG. 1C. Thus, an image which is represented by the image information carried by the light 5 is displayed on the contrast production member 3 in the image display medium 1.

Since the state of the polarization inversion is maintained until a high electric field is applied to the ferroelectric member 2, the image information carried by the light 5 is stored in the ferroelectric member 2. That is, the image display medium 1 has a property of holding the displayed image.

In order to restore the initial state of FIG. 1A, an electric field higher than the bias voltage is applied to the ferroelectric member 2 so that the direction of polarization of the entire ferroelectric member 2 is reset. Since the polarization inversion is a reversible operation, the image information stored in the ferroelectric member 2 can be erased and new image information can be written. That is, the image display medium 1 is erasable and rewritable (redisplayable).

An example of an arrangement for resetting the direction of the polarization of the ferroelectric member 2 by using a corona charging method is illustrated in FIG. 1D. In the arrangement of FIG. 1D, the transparent electrode 4 is connected to a terminal of the DC power supply 6, and the other terminal of the DC power supply 6 is connected to the corona head 7, from which an electric field is applied to the ferroelectric member 2 in a non-contact manner.

First Embodiment

Figure 2B:
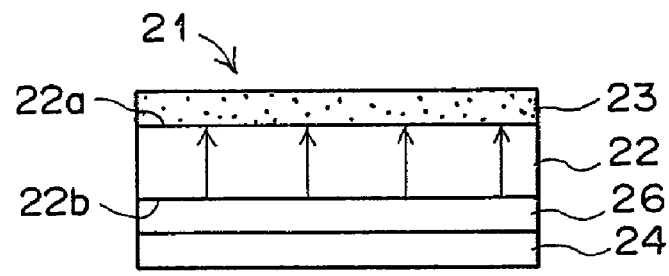
FIG. 2B is a diagram illustrating a cross section of the image display medium in the first embodiment of the present invention in a stage in which an electric field is applied to an LN substrate for monopolarization.
Figure 2C:
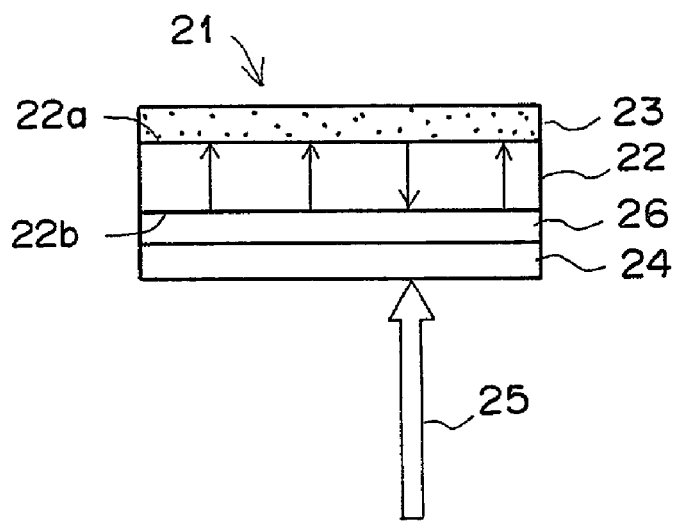
FIG. 2C is a diagram illustrating a cross section of the image display medium in the first embodiment of the present invention in a stage in which light carrying image information is applied to the LN substrate for polarization inversion.
Figure 2D:
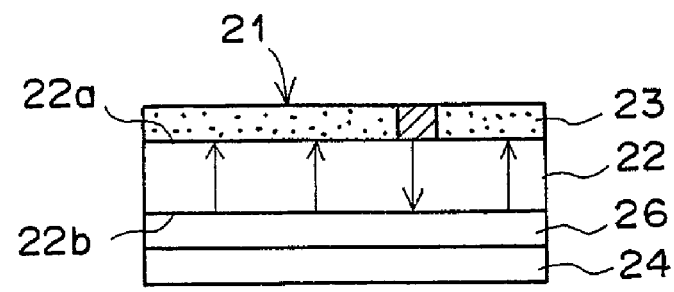
FIG. 2D is a diagram illustrating a cross section of the image display medium in the first embodiment of the present invention in a stage in which a color is formed in a contrast production member corresponding to a charge distribution pattern produced by the polarization inversion in the LN substrate caused by the application of the light.

The first embodiment of the present invention is explained below with reference to FIGS. 2A to 2D. FIG. 2A shows a cross section of a portion of the image display medium in the first embodiment of the present invention, and FIGS. 2B to 2D show a cross section of the image display medium in the first embodiment of the present invention in three stages in a process for displaying an image according to the first aspect of the present invention. The image display medium in the first embodiment of the present invention is used for displaying a monochrome image.

In FIGS. 2A to 2D, reference numeral 21 denotes the image display medium, 22 denotes a Z-cut $LiNbO_3$ substrate (hereinafter referred to as an LN substrate), 23 denotes a contrast production member, 24 denotes a transparent conductive film, 25 denotes infrared laser light, and 26 denotes a light-to-heat conversion film.

As illustrated in FIG. 2A, in order to produce the image display medium 21, the light-to-heat conversion film 26 is formed on the −Z face 22b of the LN substrate 22, and the transparent conductive film 24 is formed on the light-to-heat conversion film 26. In addition, the contrast production member 23 is arranged on the +Z face 22a of the LN substrate 22, as illustrated in FIG. 2B.

For example, the contrast production member 23 is formed by dispersing (charged) toner particles in a base which has a form of a sheet. The contrast production member 23 may be formed on the +Z face 22a of the LN substrate 22, or stuck onto the +Z face 22a of the LN substrate 22 after the contrast production member 23 is separately produced.

The light-to-heat conversion film 26 absorbs infrared light, and converts the infrared light to heat. For example, the light-to-heat conversion film 26 can be made of a metal thin film, an organic material which absorbs infrared light, or the like. In addition, the transparent conductive film 24 is made of, for example, ITO (indium tin oxide).

The operations for displaying an image by using the image display medium 21 are explained below.

Before an image is displayed, monopolarization processing is performed on the LN substrate 22 (i.e., the image display medium 21 is reset) by applying an electric field to the LN substrate 22 as illustrated in FIG. 2B. In FIG. 2B, the arrows indicate the direction of polarization of the LN substrate 22.

Next, as illustrated in FIG. 2C, the infrared laser light 25 having a predetermined wavelength and carrying monochrome image information is applied to the light-to-heat conversion film 26 from the opposite side to the contrast production member 23 through the transparent conductive film 24. In order to make the infrared laser light 25 carry the image information, for example, it is possible to modulate the infrared laser light 25 with the image information and two-dimensionally scan the light-to-heat conversion film 26 with the modulated infrared laser light 25.

When the infrared laser light 25 is applied to a region of the light-to-heat conversion film 26, the region of the light-to-heat conversion film 26 absorbs the infrared laser light 25, and generates heat. The heat is then transferred to a region of the LN substrate 22 in contact with the region of the light-to-heat conversion film 26 which generates the heat. When the infrared laser light 25 applied to the region of the LN substrate 22 has at least a predetermined intensity, polarization inversion occurs in the region of the LN substrate 22.

When the direction of the polarization in the region of the LN substrate 22 is inverted, the polarity of the surface charges produced on an area of the +Z face 22a of the LN substrate 22 located on the region of the LN substrate 22 is inverted. At this time, the toner particles dispersed in the contrast production member 23 are attracted by the surface charges produced on the area of the +Z face 22a of the LN substrate 22, and gather around the area of the +Z face 22a of the LN substrate 22. Thus, a region of the contrast production member 23 located above the region of the LN substrate 22 in which the polarization inversion occurs becomes colored. That is, contrast is produced between colored and non-colored regions of the contrast production member 23, and a monochrome image represented by the image information carried by the infrared laser light 25 is displayed on the contrast production member 23.

The image displayed in the image display medium 21 can be erased (i.e., the image display medium 21 can be reset) in a similar manner to the manner in which the image display medium of FIG. 1D is reset.

In order to promote the polarization inversion, it is possible to apply a bias voltage between the +Z face 22a and the −Z face 22b of the LN substrate 22 by using the transparent conductive film 24 so that the threshold voltage for polarization inversion in the LN substrate 22 is substantially lowered. In this case, it is preferable to apply the bias voltage in a non-contact manner using the corona charging method as explained with reference to FIG. 1D. When the contrast production member 23 hinders the application of the bias voltage, the contrast production member 23 may be stuck onto the LN substrate 22 after the application of the bias voltage.

In addition, it is possible to confirm the polarization inversion in the region of the LN substrate 22 corresponding to the region of the light-to-heat conversion film 26 which is exposed to the infrared light, by etching of the surface of the LN substrate 22 with a 1:2 mixture of HF and $HNO_3$ as an etchant, and observing the etched surface. Since the etching rate varies with the direction of polarization, the etched surface of the LN substrate 22 becomes uneven. Therefore, the polarization inversion can be confirmed by observing the unevenness of the etched surface of the LN substrate 22.

Further, since the polarity of surface charges at areas of the +Z face 22a located on regions of the LN substrate 22 in which polarization is inverted is opposite to the polarity of surface charges at the other areas of the +Z face 22a located on the other regions of the LN substrate 22 in which polarization is not inverted, it is possible to confirm the polarization inversion by measuring the charge distribution on the +Z face 22a of the LN substrate 22 with a surface potentiometer. That is, the polarization inversion can be confirmed by using the surface potentiometer.

Second Embodiment

Figure 3A:
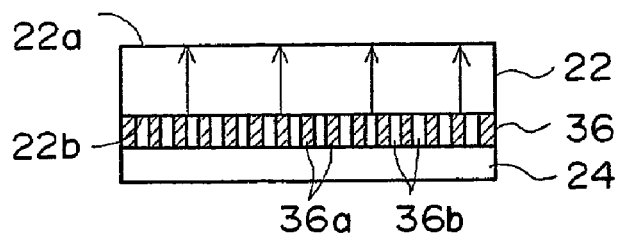
FIG. 3A is a diagram illustrating a cross section of a portion of an image display medium in a second embodiment of the present invention.
Figure 3B:
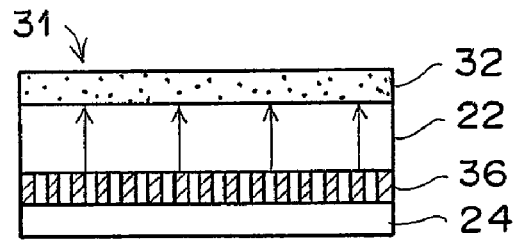
FIG. 3B is a diagram illustrating a cross section of the image display medium in the second embodiment of the present invention in a stage in which an electric field is applied to an LN substrate for monopolarization.
Figure 3C:
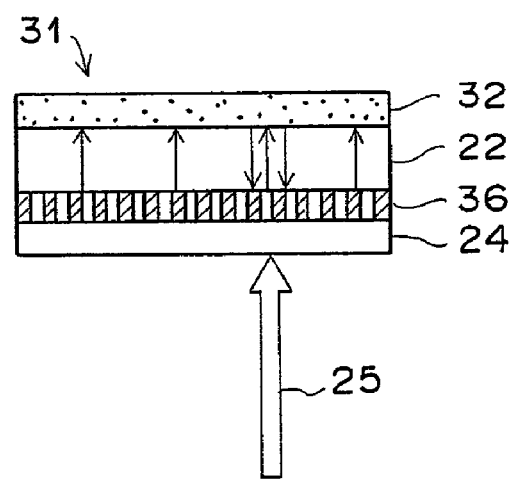
FIG. 3C is a diagram illustrating a cross section of the image display medium in the second embodiment of the present invention in a stage in which light carrying image information is applied to the LN substrate for polarization inversion.
Figure 3D:
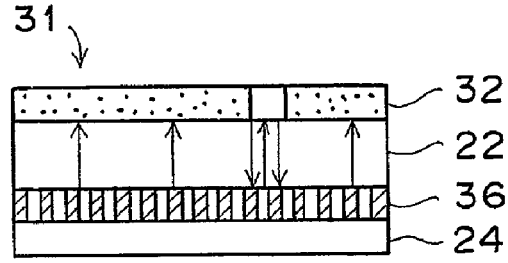
FIG. 3D is a diagram illustrating a cross section of the image display medium in the second embodiment of the present invention in a stage in which a color is formed in a contrast production member corresponding to a charge distribution pattern produced by the polarization inversion in the LN substrate caused by the application of the light.

The second embodiment of the present invention is explained below with reference to FIGS. 3A to 3D. FIG. 3A shows a cross section of a portion of the image display medium in the second embodiment of the present invention, and FIGS. 3B to 3D show a cross section of the image display medium in the second embodiment of the present invention in three stages in a process for displaying an image according to the first aspect of the present invention. The image display medium in the second embodiment of the present invention is also used for displaying a monochrome image. In FIGS. 3A to 3D, elements having the same reference numbers as FIGS. 2A to 2D have the same functions as the corresponding elements in FIGS. 2A to 2D, and only the differences from the first embodiment are explained below.

In FIGS. 3A to 3D, reference numeral 31 denotes the image display medium, 22 denotes a Z-cut $LiNbO_3$ substrate (LN substrate), 32 denotes a contrast production member, 24 denotes a transparent conductive film, 25 denotes infrared laser light, and 36 denotes a periodical light-to-heat conversion film.

As illustrated in FIG. 3A, in the image display medium 31, the periodical light-to-heat conversion film 36 is formed on the −Z face 22b of the LN substrate 22, and the transparent conductive film 24 is formed on the periodical light-to-heat conversion film 36. In addition, the contrast production member 32 is arranged on the +Z face 22a of the LN substrate 22, as illustrated in FIG. 3D.

For example, the contrast production member 32 may be a sheet made of an electrochromic material. Preferably, the electrochromic material is a conductive polymer (organic electrochromic material) such as polyaniline, polypyrrole, or polythiophene, or an inorganic electrochromic material such as tungsten oxide or molybdenum oxide. The contrast production member 32 may be formed directly on the +Z face 22a of the LN substrate 22, or stuck onto the +Z face 22a of the LN substrate 22 after the contrast production member 32 is separately formed in the form of a sheet.

In the periodical light-to-heat conversion film 36, a plurality of light-to-heat conversion portions 36a and a plurality of non-conversion portions 36b are alternately arranged, where the widths of the light-to-heat conversion portions 36a and the non-conversion portions 36b are very small. The plurality of light-to-heat conversion portions 36a are made, for example, carbon, a metal thin film, an organic material having a property of absorbing infrared light, or the like.

In this example, the pitch Λ of the plurality of light-to-heat conversion portions 36a is about 10 to 30 micrometers, and the duty ratio, which is defined as a ratio of the line width d of each light-to-heat conversion portion 36a to the pitch Λ is about 15%, as illustrated in FIG. 4.

The operations for displaying an image by using the image display medium 31 are explained below.

Before an image is displayed, monopolarization processing is performed on the LN substrate 22 (i.e., the image display medium 31 is reset) by applying an electric field to the LN substrate 22 as illustrated in FIG. 3B. In FIG. 3B, the arrows indicate the direction of polarization of the LN substrate 22.

Next, as illustrated in FIG. 3C, the infrared laser light 25 having a predetermined wavelength and carrying monochrome image information is applied to the periodical light-to-heat conversion film 36 from the opposite side to the contrast production member 32 through the transparent conductive film 24. When the infrared laser light 25 is applied to a light-to-heat conversion portion 36a, the light-to-heat conversion portion 36a generates heat, and the heat is transferred to a region of the LN substrate 22 in contact with the light-to-heat conversion portion 36a.

Therefore, polarization inversion occurs in only each region of the LN substrate 22 in contact with the light-to-heat conversion portion 36a. As mentioned before, the light-to-heat conversion portions 36a and the non-conversion portions 36b are alternately arranged, and the widths of the light-to-heat conversion portions 36a and the non-conversion portions 36b are very small. Therefore, under each region of the periodical light-to-heat conversion film 36 which is exposed to the infrared laser light 25 having at least a predetermined intensity, the effects of surface charges on regions of the LN substrate 22 in contact with the light-to-heat conversion portions 36a and other regions of the LN substrate 22 in contact with the non-conversion portions 36b cancel out each other. That is, the amount of the surface charges on each region of the LN substrate 22 located under a region of the periodical light-to-heat conversion film 36 which is exposed to the infrared laser light 25 having at least the predetermined intensity becomes nearly zero.

Thus, as illustrated in FIG. 3D, the electrochromic phenomenon does not occur in each region of the contrast production member 32 in contact with a region of the LN substrate 22 located under a region of the periodical light-to-heat conversion film 36 which is exposed to the infrared laser light 25 having at least the predetermined intensity. On the other hand, the electrochromic phenomenon occurs in each region of the contrast production member 32 in contact with a region of the LN substrate 22 located under a region of the periodical light-to-heat conversion film 36 which is not exposed to the infrared laser light 25 having at least the predetermined intensity. Therefore, contrast is produced between the regions of the contrast production member 32 located under the exposed and unexposed regions of the periodical light-to-heat conversion film 36, and thus a monochrome image represented by the image information carried by the infrared laser light 25 is displayed on the contrast production member 32.

In addition, it is possible to confirm the polarization inversion in the region of the LN substrate 22 corresponding to the region of the periodical light-to-heat conversion film 36 which is exposed to the infrared laser light 25 having at least the predetermined intensity, in the same manner as the first embodiment. Further, it is also possible to confirm that the amount of the surface charges on each area of the +Z face 22a of the LN substrate 22 located under a region of the periodical light-to-heat conversion film 36 which is exposed to the infrared laser light 25 having at least the predetermined intensity becomes substantially zero, by measuring the charge distribution on the +Z face 22a of the LN substrate 22 with a surface potentiometer.

Third Embodiment

The third embodiment of the present invention is explained below with reference to FIG. 5, which is a diagram illustrating a cross section of a portion of the image display medium in the third embodiment of the present invention. In FIG. 5, the contrast production member 32 is not illustrated. The image display medium in the third embodiment of the present invention is also used for displaying a monochrome image. In FIG. 5, elements having the same reference numbers as FIG. 3A have the same functions as the corresponding elements in FIG. 3A, and only the differences from the second embodiment are explained below.

The image display medium in the third embodiment of the present invention is different from the image display medium in the second embodiment in that a light-to-heat conversion film 26 is provided instead of the periodical light-to-heat conversion film 36, and a periodically-transparent conductive film 34 is provided instead of the transparent conductive film 24. In the periodically-transparent conductive film 34, a plurality of conductive portions 34a and a plurality of non-conductive portions 34b are alternately arranged, where the widths of the conductive portions 34a and the non-conductive portions 34b are very small. As explained below, according to this construction, the image display medium in the third embodiment has similar advantages to the second embodiment.

In the third embodiment, the aforementioned bias voltage is applied to the LN substrate 22 by using the periodically-transparent conductive film 34 during the application of the infrared laser light 25. At this time, an electric field caused by the application of the bias voltage is applied to each region of the LN substrate 22 located under one of the conductive portions 34a so that the threshold voltage for polarization inversion is substantially lowered and the polarization inversion is promoted in the region of the LN substrate 22 located under the conductive portion 34a. On the other hand, no effective electric field is caused by the application of the bias voltage by using the periodically-transparent conductive film 34 in each region of the LN substrate 22 located under one of the non-conductive portions 34b. Therefore, the polarization inversion is not promoted in the region of the LN substrate 22 located under the non-conductive portion 34b.

When the infrared laser light 25 having at least a predetermined intensity is applied to at least one region of the light-to-heat conversion film 26 through the periodically-transparent conductive film 34, the at least one region of the light-to-heat conversion film 26 generates heat. However, under the at least one region of the light-to-heat conversion film 26, the polarization inversion occurs only in each region of the LN substrate 22 located under one of the conductive portions 34a, and does not occur in each region of the LN substrate 22 located under one of the non-conductive portions 34b.

As mentioned before, the conductive portions 34a and the non-conductive portions 34b are alternately arranged, and the widths of the conductive portions 34a and the non-conductive portions 34b are very small. Therefore, in each area of the image display medium which is exposed to the infrared laser light 25 having at least a predetermined intensity, the effects of surface charges on areas of the +Z face 22a of the LN substrate 22 located under the conductive portions 34a and other regions of the LN substrate 22 located under the non-conductive portions 34b cancel out each other. That is, the amount of the surface charges on each region of the LN substrate 22 located under a region of the light-to-heat conversion film 26 which is exposed to the infrared laser light 25 having at least the predetermined intensity becomes nearly zero.

On the other hand, the amount of the surface charges on each region of the LN substrate 22 located under a region of the light-to-heat conversion film 26 which is not exposed to the infrared laser light 25 having at least the predetermined intensity does not become zero.

Thus, contrast is produced between the regions of the contrast production member 32 located under the exposed and unexposed regions of the light-to-heat conversion film 26, and thus a monochrome image represented by the image information carried by the infrared laser light 25 is displayed on the contrast production member 32.

Fourth Embodiment

The fourth embodiment of the present invention is explained below. The image display medium in the fourth embodiment of the present invention is also used for displaying a monochrome image. Only the differences from the second embodiment are explained below.

The image display medium in the fourth embodiment of the present invention is different from the image display medium in the second embodiment in that a ferroelectric thin film is provided instead of the LN substrate 22. Since the thickness of the ferroelectric member is reduced, the threshold voltage for polarization inversion can be lowered.

The ferroelectric thin film used in the fourth embodiment is a thin film being made of $LiNbO_3$ and having a thickness of about 10 micrometers, and produced by hydrolysis in accordance with the so-called Sol-Gel method using two alkoxides $LiOC_2H_5$ and $Nb(OC_2H_5)_5$ as starting materials.

The applicant has confirmed that even when the image display medium is formed as above, a monochrome image represented by the image information carried by the infrared laser light 25 is displayed on the contrast production member 32 in a similar manner to the third embodiment.

Further, the applicant has also confirmed that a monochrome image represented by the image information carried by the infrared laser light 25 can be displayed on the contrast production member 23 of the image display medium 21 when the LN substrate 22 is replaced with a $LiNbO_3$ thin film in the first embodiment.

Fifth Embodiment

The fifth embodiment of the present invention is explained below with reference to FIGS. 6A and 6B, which show a cross section of the image display medium in the fifth embodiment of the present invention in two stages in a process for displaying an image according to the first aspect of the present invention. The image display medium in the fifth embodiment of the present invention is also used for displaying a monochrome image. In FIGS. 6A and 6B, elements having the same reference numbers as FIGS. 2A to 2D have the same functions as the corresponding elements in FIGS. 2A to 2D, and only the differences from the first embodiment are explained below.

In FIGS. 6A and 6B, reference numeral 41 denotes the image display medium, 42 denotes a doped $LiNbO_3$ thin film (hereinbelow referred to as a doped LN thin film), 23 denotes a contrast production member, 24 denotes a transparent conductive film, and 25 denotes infrared laser light.

The doped LN thin film 42 is a thin film made of $LiNbO_3$ doped with a dopant which absorbs infrared light. The contrast production member 23 is joined to a face 42a of the doped LN thin film 42, and the transparent conductive film 24 is formed on the other face 42b of the doped LN thin film 42.

The doped LN thin film 42 is produced by adding a dopant containing a metal which absorbs infrared light when a $LiNbO_3$ thin film is produced, and precipitating metal particles in the $LiNbO_3$ thin film by heat treatment or the like. For example, the dopant contains at least one of Mg, Ti, Cr, Ni, Cu, Zn, Zr, Nb, Mo, Rh, Ag, In, Sn, Au, and Pb. In addition, the contrast production member 23 is formed by dispersing (charged) toner particles in a base which has a form of a sheet.

The operations for displaying an image by using the image display medium 41 are explained below.

Before an image is displayed, monopolarization processing is performed on the doped LN thin film 42 (i.e., the image display medium 41 is reset) by applying an electric field to the doped LN thin film 42 as illustrated in FIG. 6B. In FIG. 6B, the arrows indicate the direction of polarization of the doped LN thin film 42.

Next, as illustrated in FIG. 6B, the infrared laser light 25 having a predetermined wavelength and carrying monochrome image information is applied to the doped LN thin film 42 from the opposite side to the contrast production member 23 through the transparent conductive film 24. When the infrared laser light 25 having at least a predetermined intensity is applied to a region of the doped LN thin film 42, the dopant contained in the region of the doped LN thin film 42 absorbs the infrared laser light 25 and generates heat. Therefore, polarization inversion occurs in the region of the doped LN thin film 42 to which the infrared laser light 25 having at least the predetermined intensity is applied.

Thus, the polarity of surface charges on an area of the face 42a on the above region of the doped LN thin film 42 becomes opposite to the polarity of surface charges another area of the face 42a on another region of the doped LN thin film 42 to which the infrared laser light 25 having at least the predetermined intensity is not applied. At this time, the toner particles dispersed in the contrast production member 23 are attracted by the surface charges on the area of the face 42a on the region of the doped LN thin film 42 to which the infrared laser light 25 having at least the predetermined intensity is applied, and gather around the area of the face 42a on the region of the doped LN thin film 42 to which the infrared laser light 25 having at least the predetermined intensity is applied. Thus, a region of the contrast production member 23 located above the region of the LN substrate 22 in which polarization inversion occurs becomes colored. That is, contrast is produced between the colored and non-colored regions of the contrast production member 23, and a monochrome image represented by the image information carried by the infrared laser light 25 is displayed on the contrast production member 23.

Alternatively, in the image display medium 41 of FIGS. 6A and 6B, the transparent conductive film 24 may be replaced with the aforementioned periodically-transparent conductive film 34 illustrated in FIG. 5, and a bias voltage may be applied to the image display medium by using the periodically-transparent conductive film 34 in a similar manner to the third embodiment. In this case, the image display medium has similar advantages to the third embodiment.

Sixth Embodiment

The sixth embodiment of the present invention is explained below with reference to FIGS. 7A and 7B, which show a cross section of the image display medium in the sixth embodiment of the present invention in two stages in a process for displaying an image according to the first aspect of the present invention. The image display medium in the sixth embodiment of the present invention is used for displaying a color image.

In FIGS. 7A and 7B, reference numeral 51 denotes the image display medium, 52 denotes a ferroelectric member, 53 denotes a contrast production member, 53R, 53G, and 53B each denote a type of color-formation toner element, 54 denotes a transparent electrode, 57 denotes a wavelength-selective transparent film, and 57R, 57G, and 57B each denote a type of microfilter. For example, the ferroelectric member 52 is a LiNbO$_3$ thin film (LN thin film), and the transparent electrode 54 is a transparent conductive film.

As illustrated in FIGS. 7A and 7B, the contrast production member 53 is joined to a face 52a of the ferroelectric member 52, and the light-to-heat conversion film 26 is formed on the other face 52b of the ferroelectric member 52. In addition, the wavelength-selective transparent film 57 is formed on the light-to-heat conversion film 26, and the transparent electrode 54 is formed on the wavelength-selective transparent film 57.

Figure 8:
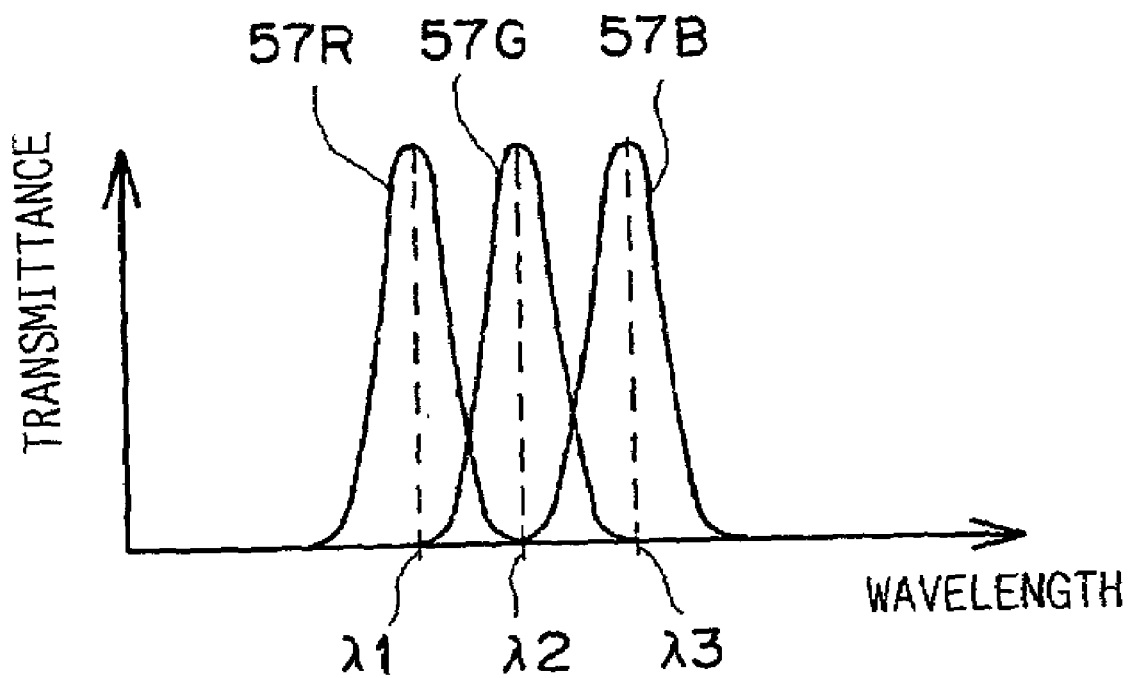
FIG. 8 is a graph indicating basic spectral transparency characteristics of the microfilters of the types 57R, 57G, and 57B.

In addition, a plurality of microfilters of the three types 57R, 57G, and 57B are periodically arranged in the wavelength-selective transparent film 57, where each microfilter has a size (e.g., of a several micrometer square) corresponding to the pixel size of an image to be displayed. The microfilters of each type 57R, 57G, or 57B are transparent to infrared light having a different one of three wavelengths λ1, λ2, and λ3. Basic spectral transparency characteristics of the microfilters of the types 57R, 57G, and 57B are indicated in FIG. 8.

For example, the microfilters of the three types 57R, 57G, and 57B can be produced as follows.

First, a plurality of microfilters for the first color (e.g., of the type 57R) are formed on a base by using a shadow mask which has a plurality of small openings corresponding to a plurality of color pixels. Next, the shadow mask is shifted by the width of one color pixel, and a plurality of microfilters for the second color (e.g., of the type 57G) are formed by using the shadow mask. Finally, the shadow mask is further shifted by the width of one color pixel, and a plurality of microfilters for the third color (e.g., of the type 57B) are formed by using the shadow mask. Specifically, the plurality of microfilters of the types 57R, 57G, and 57B can be made of oxide films formed by evaporation.

In addition, a plurality of color-formation elements of the three types 53R, 53G, and 53B are periodically arranged in the contrast production member 53 in positions corresponding to the plurality of microfilters of the three types 57R, 57G, and 57B, respectively. The color-formation elements of the types 53R, 53G, and 53B are made of color forming materials which become colored red, green, and blue, respectively, according to electric charges which exert influences on the color-formation elements. The size of each color-formation element is the same as that of the corresponding microfilter.

For example, the plurality of color-formation elements of the types 53R, 53G, and 53B are a plurality of color-formation toner elements of the three types containing color forming toners which become colored red, green, and blue, respectively, by influences of electric charges distributed in the vicinities of the color-formation toner elements. The contrast production member 53 is formed by periodically arranging a plurality of color-formation toner elements of the three types in a base having a form of a sheet so that the positions of the plurality of color-formation toner elements of the three types correspond to the positions of the plurality of microfilters of the three types 57R, 57G, and 57B, respectively, and the size of each color-formation toner element is the same as that of the corresponding microfilter.

According to the first aspect of the present invention, a color image is displayed by using the image display medium 51 as follows.

Before an image is displayed, monopolarization processing is performed on the ferroelectric member 52 in the image display medium 51 (i.e., the image display medium 51 is reset) by applying an electric field to the ferroelectric member 52 as illustrated in FIG. 7A. In FIG. 7A, the arrows indicate the direction of polarization of the ferroelectric member 52.

Next, as illustrated in FIG. 7B, first infrared laser light 55 having the wavelength λ1 and carrying red image information is applied to the wavelength-selective transparent film 57 from the opposite side to the contrast production member 53 through the transparent electrode 54. In order to make the first infrared laser light 55 carry the red image information, for example, it is possible to modulate the first infrared laser light 55 with the red image information and two-dimensionally scan the wavelength-selective transparent film 57 with the modulated first infrared laser light 55.

When the first infrared laser light 55 is applied to the wavelength-selective transparent film 57, the first infrared laser light 55 can pass through only the microfilters of the type 57R, i.e., only the regions of the light-to-heat conversion film 26 in contact with the microfilters of the type 57R can be exposed to the first infrared laser light 55. Therefore, when the first infrared laser light 55 passes through a microfilter of the type 57R and is applied to a region of the light-to-heat conversion film 26 in contact with the microfilter of the type 57R, the region of the light-to-heat conversion film 26 generates heat, and the heat is transferred to a region of the ferroelectric member 52 in contact with the region of the light-to-heat conversion film 26, Thus, when the first infrared laser light 55 applied to the above region of the light-to-heat conversion film 26 has at least a predetermined intensity, polarization inversion occurs in the region of the ferroelectric member 52 in contact with the region of the light-to-heat conversion film 26 which generates the heat, and the polarity of surface charges of the above region of the ferroelectric member 52 in contact with the region of the light-to-heat conversion film 26 which generates the heat is inverted. Resultantly, one of the plurality of color-formation toner elements of the type 53R in contact with the above region of the ferroelectric member 52 becomes colored red.

In parallel with the application of the first infrared laser light 55 having the wavelength λ1, second infrared laser light having the wavelength λ2 and carrying green image information is also applied to the wavelength-selective transparent film 57 from the opposite side to the contrast production member 53 through the transparent electrode 54. In order to make the second infrared laser light carry the green image information, for example, it is possible to modulate the second infrared laser light with the green image information and two-dimensionally scan the wavelength-selective transparent film 57 with the modulated second infrared laser light.

When the second infrared laser light is applied to the wavelength-selective transparent film 57, the second infrared laser light can pass through only the microfilters of the type 57G, i.e., only the regions of the light-to-heat conversion film 26 in contact with the microfilters of the type 57G can be exposed to the second infrared laser light. Therefore, when the second infrared laser light passes through a microfilter of the type 57G and is applied to a region of the light-to-heat conversion film 26 in contact with the microfilter of the type 57G, the region of the light-to-heat conversion film 26 generates heat, and the heat is transferred to a region of the ferroelectric member 52 in contact with the region of the light-to-heat conversion film 26, Thus, when the second infrared laser light applied to the above region of the light-to-heat conversion film 26 has at least the predetermined intensity, polarization inversion occurs in the region of the ferroelectric member 52 in contact with the region of the light-to-heat conversion film 26 which generates the heat, and the polarity of surface charges of the above region of the ferroelectric member 52 in contact with the region of the light-to-heat conversion film 26 which generates the heat is inverted. Resultantly, one of the plurality of color-formation toner elements of the type 53G in contact with the above region of the ferroelectric member 52 becomes colored green.

Further, in parallel with the application of the first infrared laser light 55 having the wavelength λ1 and the second infrared laser light having the wavelength λ2, third infrared laser light having the wavelength λ3 and carrying blue image information is also applied to the wavelength-selective transparent film 57 from the opposite side to the contrast production member 53 through the transparent electrode 54. In order to make the third infrared laser light carry the blue image information, for example, it is possible to modulate the third infrared laser light with the blue image information and two-dimensionally scan the wavelength-selective transparent film 57 with the modulated third infrared laser light.

When the third infrared laser light is applied to the wavelength-selective transparent film 57, the third infrared laser light can pass through only the microfilters of the type 57B, i.e., only the regions of the light-to-heat conversion film 26 in contact with the microfilters of the type 57B can be exposed to the third infrared laser light. Therefore, when the third infrared laser light passes through a microfilter of the type 57B and is applied to a region of the light-to-heat conversion film 26 in contact with the microfilter of the type 57B, the region of the light-to-heat conversion film 26 generates heat, and the heat is transferred to a region of the ferroelectric member 52 in contact with the above region of the light-to-heat conversion film 26, Thus, when the third infrared laser light applied to the above region of the light-to-heat conversion film 26 has at least the predetermined intensity, polarization inversion occurs in the above region of the ferroelectric member 52 in contact with the region of the light-to-heat conversion film 26 which generates the heat, and the polarity of surface charges of the above region of the ferroelectric member 52 in contact with the region of the light-to-heat conversion film 26 which generates the heat is inverted. Resultantly, one of the plurality of color-formation toner elements of the type 53B in contact with the above region of the ferroelectric member 52 becomes colored blue.

As described above, the color formation in the color-formation toner elements 53R, 53G, and 53B is respectively controlled based on the red, green, and blue image information. Therefore, a full color image represented by the red, green, and blue image information can be displayed on the contrast production member 53.

The initial state of the image display medium 51 can be restored by resetting the direction of polarization of the entire ferroelectric member 52 in a similar manner to the first embodiment.

The image displayed as above is constituted by pixels determined by the color-formation toner elements 57R, 57G, or 57B. Therefore, when the sizes of the microfilters of the types 53R, 53G, and 53B and the color-formation toner elements 57R, 57G, or 57B are reduced, the resolution of the image is increased.

In addition, it is possible to confirm the polarization inversion in the ferroelectric member 52 in the same manner as the first embodiment. Further, it is also possible to confirm that the surface charge distribution of the ferroelectric member 52 is produced in response to the application of the first, second, and third infrared laser light as explained above, by measurement using a surface potentiometer.

Seventh Embodiment

Figure 9A:
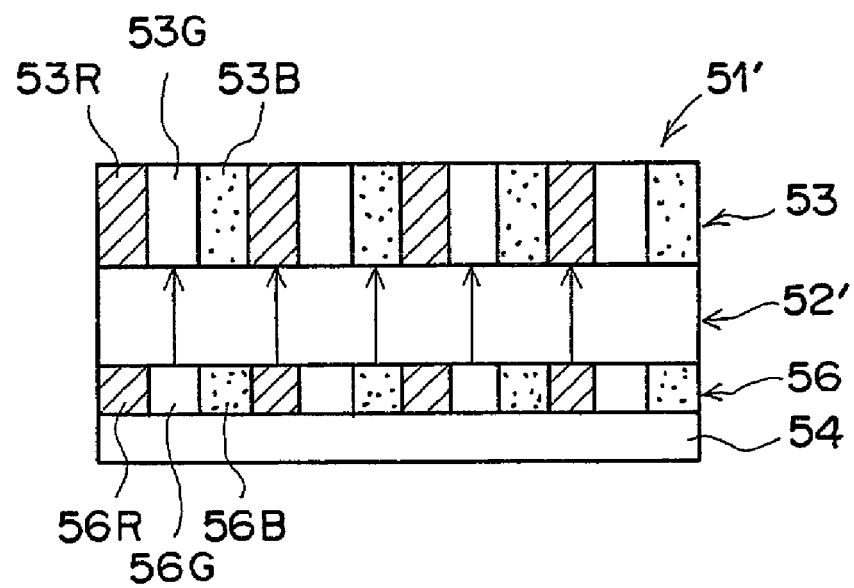
FIG. 9A is a diagram illustrating a cross section of an image display medium in an seventh embodiment of the present invention in a stage in which an electric field is applied to a ferroelectric thin film for monopolarization.
Figure 9B:
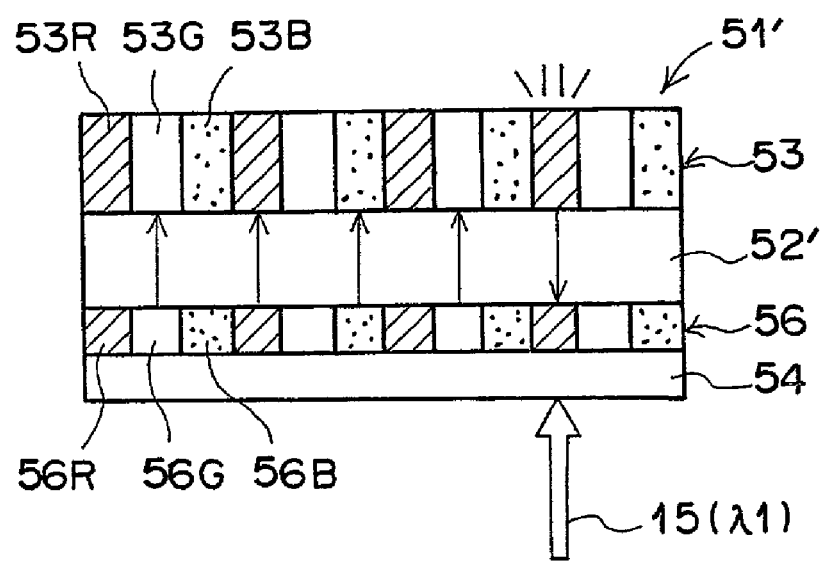
FIG. 9B is a diagram illustrating a cross section of the image display medium in the seventh embodiment of the present invention in a stage in which light carrying image information is applied to the ferroelectric thin film for polarization inversion and color formation.

The seventh embodiment of the present invention is explained below with reference to FIGS. 9A and 9B, which show a cross section of the image display medium in the seventh embodiment of the present invention in two stages in a process for displaying an image according to the first aspect of the present invention. The image display medium in the seventh embodiment of the present invention is also used for displaying a color image. In FIGS. 9A and 9B, elements having the same reference numbers as FIGS. 7A and 7B have the same functions as the corresponding elements in FIGS. 7A and 7B In FIGS. 9A and 9B, reference numeral 51' denotes the image display medium, 52' denotes a ferroelectric member, 53 denotes a contrast production member, 53R, 53G, and 53B each denote a type of color-formation element, 54 denotes a transparent electrode, 56 denotes a wavelength-selective light-to-heat conversion film, and 56R, 56G, and 56B each denote a type of heating element. For example, the ferroelectric member 52' is an LN substrate or a ferroelectric thin film such as an LN thin film, and the transparent electrode 54 is a transparent conductive film.

As illustrated in FIGS. 9A and 9B, the contrast production member 53 is joined to a face of the ferroelectric member 52', and the wavelength-selective light-to-heat conversion film 56 is formed on the other face of the ferroelectric member 52'. In addition, the transparent electrode 54 is formed on the wavelength-selective light-to-heat conversion film 56.

Figure 10:
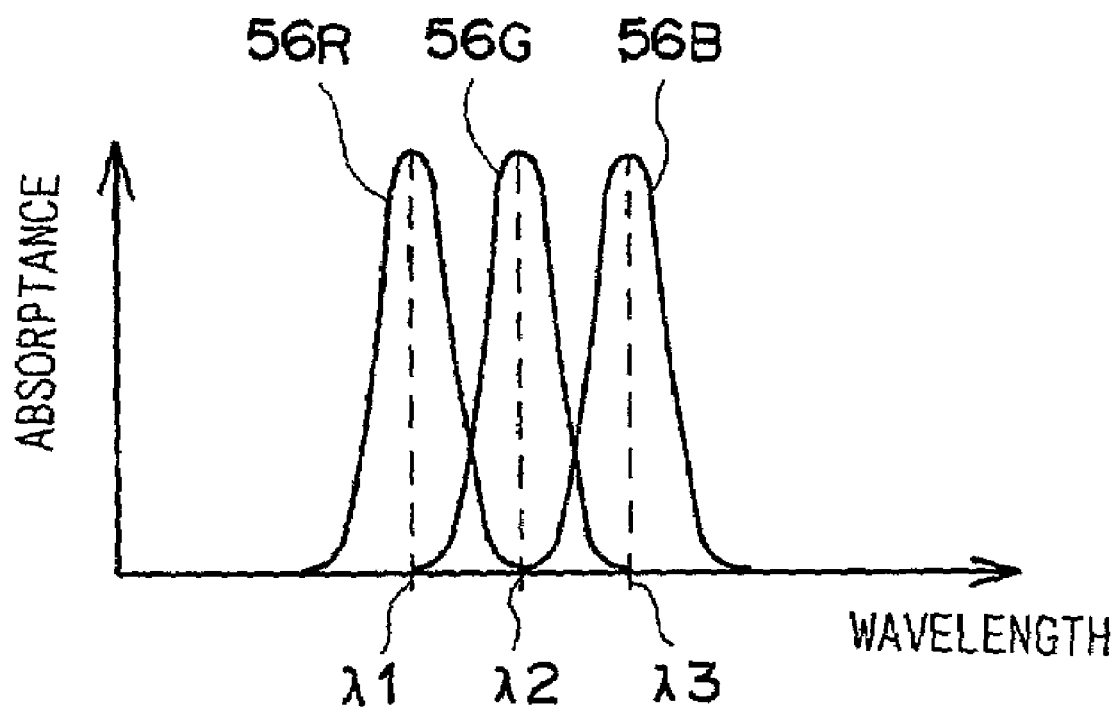
FIG. 10 is a graph indicating basic spectral absorption characteristics of the heating elements of the types 56R, 56G, and 56B.

In addition, a plurality of heating elements of the three types 56R, 56G, and 56B are periodically arranged in the wavelength-selective light-to-heat conversion film 56, where each heating element has a size (e.g., of a several micrometer square) corresponding to the pixel size of an image to be displayed. The heating elements of each type 56R, 56G, or 56B selectively absorb infrared light having a different one of three wavelengths $\lambda 1$, $\lambda 2$, and $\lambda 3$, and convert the absorbed infrared light into heat. Basic spectral absorption characteristics of the heating elements of the types 56R, 56G, and 56B are indicated in FIG. 10.

Further, a plurality of color-formation elements of the three types 53R, 53G, and 53B are periodically arranged in the contrast production member 53 in positions corresponding to the plurality of heating elements of the three types 56R, 56G, and 56B, respectively. The color-formation elements of the types 53R, 53G, and 53B are made of color forming materials which become colored red, green, and blue, respectively, according to electric charges which exert influences on the color-formation elements. The size of each color-formation element is the same as that of the corresponding heating element.

According to the first aspect of the present invention, a color image is displayed by using the image display medium 51' as follows.

Before an image is displayed, monopolarization processing is performed on the ferroelectric member 52' in the image display medium 51' (i.e., the image display medium 51' is reset) by applying an electric field to the ferroelectric member 52' as illustrated in FIG. 9A. In FIG. 9A, the arrows indicate the direction of polarization of the ferroelectric member 52'.

Next, as illustrated in FIG. 9B, first infrared light 55 having the wavelength $\lambda 1$ and carrying red image information is applied to the light-to-heat conversion film 56 from the opposite side to the contrast production member 53 through the transparent electrode 54. In order to make the first infrared light 55 carry the red image information, for example, it is possible to modulate the first infrared light 55 with the red image information and two-dimensionally scan the light-to-heat conversion film 56 with the modulated first infrared light 55.

When the first infrared light 55 is applied to the ferroelectric member 52' as above, only the heating elements of the type 56R to which the first infrared light 55 is applied absorb the first infrared light 55 and generate heat. When the first infrared light 55 is applied to a heating element of the type 56R in contact with a first region of the ferroelectric member 52', and has at least a predetermined intensity, polarization inversion occurs in the first region of the ferroelectric member 52'.

When the direction of the polarization in the first region of the ferroelectric member 52' is inverted, the polarity of the surface charges of the first region of the ferroelectric member 521 is inverted. Therefore, one of the plurality of color-formation elements 53R located corresponding to the first region of the ferroelectric member 52' (i.e., corresponding to each heating element of the type 56R which generates heat) becomes colored red.

In parallel with the application of the first infrared light 55 having the wavelength $\lambda 1$, second infrared light having the wavelength $\lambda 2$ and carrying green image information is also applied to the light-to-heat conversion film 56 from the opposite side to the contrast production member 53 through the transparent conductive film 54. In order to make the second infrared light carry the green image information, for example, it is possible to modulate the second infrared light with the green image information and two-dimensionally scan the light-to-heat conversion film 56 with the modulated second infrared light.

When the second infrared light is applied to the light-to-heat conversion film 56 as above, only the heating elements of the type 56G to which the second infrared light is applied absorb the second infrared light and generate heat. When the second infrared light is applied to a heating element of the type 56G in contact with a second region of the ferroelectric member 52', and has at least the predetermined intensity, polarization inversion occurs in the second region of the ferroelectric member 52'.

When the direction of the polarization in the second region of the ferroelectric member 52' is inverted, the polarity of the surface charges of the second region of the ferroelectric member 52' is inverted. Therefore, one of the plurality of color-formation elements 53G located corresponding to the second region of the ferroelectric member 52' (i.e., corresponding to each heating element of the type 56G which generates heat) becomes colored green.

Further, in parallel with the application of the first infrared light 55 having the wavelength $\lambda 1$ and the second infrared light having the wavelength $\lambda 2$, third infrared light having the wavelength $\lambda 3$ and carrying blue image information is also applied to the light-to-heat conversion film 56 from the opposite side to the contrast production member 53 through the transparent conductive film 54. In order to make the third infrared light carry the blue image information, for example, it is possible to modulate the third infrared light with the blue image information and two-dimensionally scan the light-to-heat conversion film 56 with the modulated third infrared light.

When the third infrared light is applied to the light-to-heat conversion film 56 as above, only the heating elements of the type 56B to which the third infrared light is applied absorb the third infrared light and generate heat. When the third infrared light is applied to a heating element of the type 56B in contact with a third region of the ferroelectric member 52', and has at least the predetermined intensity, polarization inversion occurs in the third region of the ferroelectric member 52'.

When the direction of the polarization in the third region of the ferroelectric member 52' is inverted, the polarity of the surface charges of the third region of the ferroelectric member 52' is inverted. Therefore, one of the plurality of color-formation elements 53B located corresponding to the third region of the ferroelectric member 52' (i.e., corresponding to each heating element of the type 56B which generates heat) becomes colored blue.

As described above, the color formation in the color-formation elements 53R, 53G, and 53B is respectively controlled based on the red, green, and blue image information. Therefore, a full color image represented by the red, green, and blue image information can be displayed on the contrast production member 53.

The initial state of the image display medium 51' can be restored by resetting the direction of polarization of the entire ferroelectric member 2 in a similar manner to the first embodiment.

The image displayed as above is constituted by pixels determined by the color-formation elements 53R, 53G, or 53B. Therefore, when the sizes of the heating elements of the types 56R, 56G, and 56B and the color-formation elements 53R, 53G, or 53B are reduced, the resolution of the image is increased.

As mentioned before, each heating element has the size of, for example, a several micrometer square. In addition, it is confirmed that polarization inversion in a ferroelectric film can be controlled in each area having a size of several micrometers. In practice, the pixel size can be reduced to approximately the diameter of a laser beam such as an infrared laser beam with which the image display medium is scanned.

Eighth Embodiment

Figure 11:
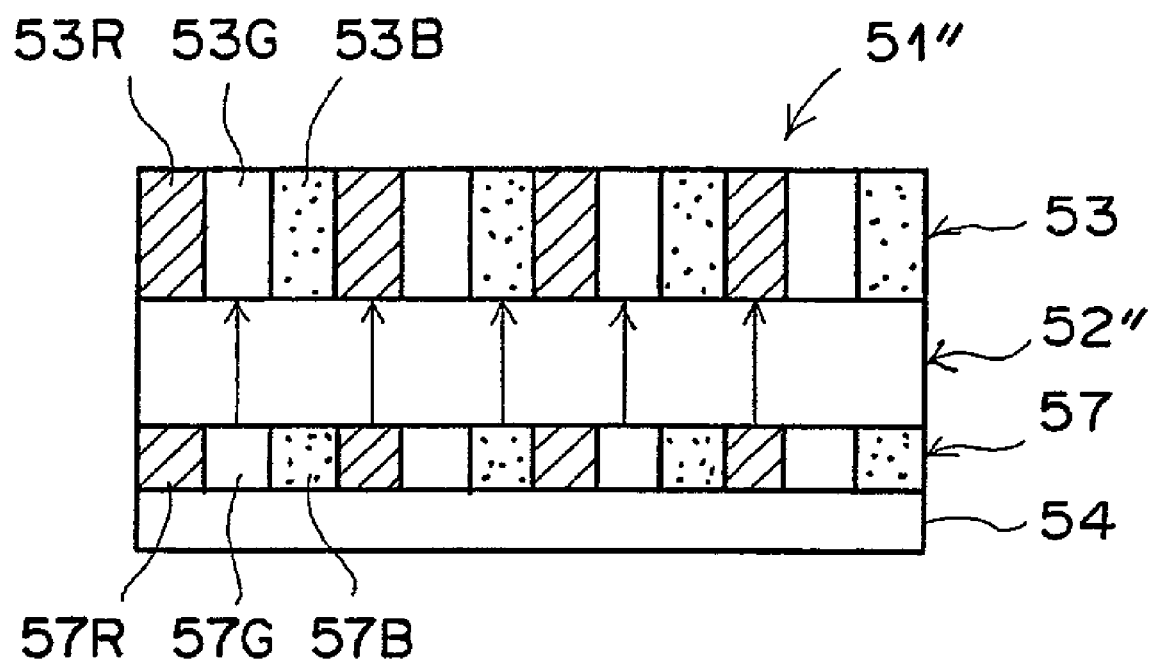
FIG. 11 is a diagram illustrating a cross section of an image display medium in an eighth embodiment of the present invention.

The eighth embodiment of the present invention is explained below with reference to FIG. 11, which shows a cross section of the image display medium in the eighth embodiment of the present invention. The image display medium in the eighth embodiment of the present invention is also used for displaying a color image. In FIG. 11, elements having the same reference numbers as FIGS. 7A and 7B have the same functions as the corresponding elements in FIGS. 7A and 7B, and only the differences from the image display medium 51 of FIGS. 7A and 7B are explained below.

The image display medium in the eighth embodiment of the present invention is different from the image display medium in the sixth embodiment in that the ferroelectric member per se generates heat in response to application of infrared light, and the light-to-heat conversion film 26 is removed. As explained below, the ferroelectric member is realized by a ferroelectric thin film doped with a dopant which absorbs infrared light.

In the image display medium 51" of FIG. 11, first infrared light having the wavelength λ1 and carrying red image information, second infrared light having the wavelength λ2 and carrying green image information, and third infrared light having the wavelength λ3 and carrying blue image information are applied to the ferroelectric member 52" from the opposite side to the contrast production member 53 through the transparent conductive film 54 and the wavelength-selective transparent film 57.

When the first infrared light is applied to the ferroelectric member 52", only regions of the ferroelectric member 52" in contact with the microfilters of the type 57R to which the first infrared light 55 having the wavelength of λ1 is applied are exposed to the first infrared light and generate heat. When the first infrared light is applied to a region of the ferroelectric member 52" in contact with a microfilter of the type 57R and has at least a predetermined intensity, polarization inversion occurs in the region of the ferroelectric member 52" in response to the application of the first infrared light, and the polarity of surface charges of the above region of the ferroelectric member 52" in contact with the microfilter of the type 57R is inverted. Resultantly, one of the plurality of color-formation elements of the type 53R in contact with the above region of the ferroelectric member 52" becomes colored red.

In addition, when the second infrared light is applied to the ferroelectric member 52", only regions of the ferroelectric member 52" in contact with the microfilters of the type 57G to which the second infrared light 55 having the wavelength of λ2 is applied are exposed to the second infrared light and generate heat. When the second infrared light is applied to a region of the ferroelectric member 52" in contact with a microfilter of the type 57G and has at least the predetermined intensity, polarization inversion occurs in the region of the ferroelectric member 52" in response to the application of the second infrared light, and the polarity of surface charges of the above region of the ferroelectric member 52" in contact with the microfilter of the type 57G is inverted. Resultantly, one of the plurality of color-formation elements of the type 53G in contact with the above region of the ferroelectric member 52" becomes colored green.

Further, when the third infrared light is applied to the ferroelectric member 52", only regions of the ferroelectric member 52" in contact with the microfilters of the type 57G to which the third infrared light 55 having the wavelength of λ3 is applied are exposed to the third infrared light and generate heat. When the third infrared light is applied to a region of the ferroelectric member 52" in contact with a microfilter of the type 57B and has at least the predetermined intensity, polarization inversion occurs in the region of the ferroelectric member 52" in response to the application of the third infrared light, and the polarity of surface charges of the above region of the ferroelectric member 52" in contact with the microfilter of the type 57B is inverted. Resultantly, one of the plurality of color-formation elements of the type 53B in contact with the above region of the ferroelectric member 52" becomes colored blue.

As described above, due to the arrangement of the microfilters 57R, 57G, and 57B, the polarization inversion in the ferroelectric member 52" is controlled for each region corresponding to the size of the microfilter 57R, 57G, or 57B. Therefore, the color formation in the color-formation elements 53R, 53G, and 53B are respectively controlled based on the red, green, and blue image information, and a full color image represented by the red, green, and blue image information can be displayed on the contrast production member 53.

What is claimed is:

1. A method for displaying an image, comprising the steps of:
   (a) producing a polarization inversion pattern in a ferroelectric member in accordance with image information so as to produce a surface charge pattern corresponding to the polarization inversion pattern; and
   (b) producing an image contrast in a contrast production member by an influence of the surface charge pattern, where the contrast production member is joined to the ferroelectric member.

2. A method according to claim 1, wherein said polarization inversion pattern is produced by heating said ferroelectric member so as to produce a heat distribution corresponding to the image information in the ferroelectric member.

3. A method according to claim 2, wherein said ferroelectric member is heated by applying infrared light carrying said image information to the ferroelectric member.

4. A method according to claim 3, wherein said infrared light includes three types of infrared light having three different wavelengths and carrying three pieces of image information representing three different color components of said image, respectively, said infrared light is applied to the ferroelectric member through a wavelength-selective transparent film, a plurality of light-to-heat conversion elements of each of three types are periodically arranged in a plurality of first predetermined positions in said wavelength-selective transparent film, and are selectively transparent to one of the three types of infrared light, and a plurality of color-formation elements of each of three types are periodically arranged in a plurality of second predetermined positions corresponding to said plurality of first predetermined positions in said contrast production member, and form a color for one of said three different color components.

5. A method according to claim 3, wherein said ferroelectric member is doped with a dopant which absorbs said infrared light.

6. A method according to claim 5, wherein said dopant contains at least one of Mg, Ti, Cr, Ni, Cu, Zn, Zr, Nb, Mo, Rh, Ag, In, Sn, Au, and Pb.

7. A method according to claim 2, wherein said ferroelectric member is heated by applying infrared light carrying said image information to a light-to-heat conversion member which is arranged in close proximity to or in contact with said ferroelectric member, where said light-to-heat conversion member absorbs said infrared light.

8. A method according to claim 7, wherein said infrared light includes three types of infrared light having three different wavelengths and carrying three pieces of image information representing three different color components of said image, respectively, a plurality of light-to-heat conversion elements of each of three types are periodically arranged in a plurality of first predetermined positions in said light-to-heat conversion member, selectively absorb one of the three types of infrared light, and convert the one of the three types of infrared light into heat, and a plurality of color-formation elements of each of three types are periodically arranged in a plurality of second predetermined positions corresponding to said plurality of first predetermined positions in said contrast production member, and form a color for one of said three different color components.

9. A method according to claim 7, wherein said light-to-heat conversion member includes a plurality of light-to-heat conversion portions and a plurality of non-conversion portions intermingled with the plurality of small light-to-heat conversion portions, and the plurality of light-to-heat conversion portions and the plurality of non-conversion portions are small in size.

10. A method according to claim 9, wherein said plurality of light-to-heat conversion portions and said plurality of non-conversion portions are alternately arranged at predetermined intervals.

11. A method according to claim 1, wherein in said step (a), a bias voltage is applied to the ferroelectric member through a transparent conductive film which is arranged on one side of the ferromagnetic member.

12. A method according to claim 11, wherein said transparent conductive film includes a plurality of conductive portions and a plurality of non-conductive portions intermingled with the plurality of conductive portions, and the plurality of conductive portions and the plurality of non-conductive portions are small in size.

13. A method according to claim 12, wherein said plurality of conductive portions and plurality of non-conductive portions are alternately arranged at predetermined intervals.

14. A method according to claim 11, wherein said transparent conductive film is transparent to infrared light.

15. A method according to claim 1, wherein said contrast production member is constituted by a base in which charged particles are dispersed.

16. The method according to claim 15, wherein said charged particles are attracted to an area in said contrast production member corresponding to said polarization inversion pattern of said ferroelectric member to produce said image contrast.

17. A method according to claim 1, wherein said contrast production member is made of an electrochromic material.

18. A method according to claim 1, wherein said ferroelectric member is made of an inorganic ferroelectric oxide.

19. A method according to claim 18, wherein said ferroelectric member has a form of a thin film, and said inorganic ferroelectric oxide is made from metal alkoxides.

20. A method according to claim 18, wherein said inorganic ferroelectric oxide is $LiNb_xTa_{1-x}O_3$, where $0 \leq x \leq 1$.

21. An apparatus for displaying an image, comprising:

a ferroelectric member in which a polarization inversion pattern is produced in accordance with image information so as to produce a surface charge pattern corresponding to the polarization inversion pattern; and a contrast production member which is joined to said ferroelectric member, and in which an image contrast is produced by an influence of the surface charge pattern.

22. An apparatus according to claim 21, wherein said polarization inversion pattern is produced by heating said ferroelectric member so as to produce a heat distribution corresponding to the image information to the ferroelectric member.

23. An apparatus according to claim 22, wherein said ferroelectric member is heated by applying infrared light carrying said image information to the ferroelectric member.

24. An apparatus according to claim 23, further comprising a wavelength-selective transparent film, wherein said infrared light includes three types of infrared light having three different wavelengths and carrying three pieces of image information representing three different color components of said image, respectively, said infrared light is applied the ferroelectric member through said wavelength-selective transparent film, a plurality of light-to-heat conversion elements of each of three types are periodically arranged in a plurality of first predetermined positions in said wavelength-selective transparent film, and are selectively transparent to one of the three types of infrared light, and a plurality of color-formation elements of each of three types are periodically arranged in a plurality of second predetermined positions corresponding to said plurality of first predetermined positions in said contrast production member, and form a color for one of said three different color components.

25. An apparatus according to claim 23, wherein said ferroelectric member is doped with a dopant which absorbs said infrared light.

26. An apparatus according to claim 25, wherein said dopant contains at least one of Mg, Ti, Cr, Ni, Cu, Zn, Zr, Nb, Mo, Rh, Ag, In, Sn, Au, and Pb.

27. An apparatus according to claim 22, further comprising, a light-to-heat conversion member which is arranged in close proximity to or in contact with said ferroelectric member, absorbs said infrared light, and converts the infrared light into heat, and a light application unit which applies said infrared light to said light-to-heat conversion member.

28. An apparatus according to claim 27, wherein said infrared light includes three types of infrared light having three different wavelengths and carrying three pieces of image information representing three different color components of said image, respectively,
   a plurality of light-to-heat conversion elements of each of three types are periodically arranged in a plurality of first predetermined positions in said light-to-heat conversion member, selectively absorb one of the three types of infrared light, and convert the one of the three types of infrared light into heat, and
   a plurality of color-formation elements of each of three types are periodically arranged in a plurality of second predetermined positions corresponding to said plurality of first predetermined positions in said contrast production member, and form a color for one of said three different color components.

29. An apparatus according to claim 27, wherein said light-to-heat conversion member includes, a plurality of light-to-heat conversion portions and a plurality of non-conversion portions intermingled with the plurality of small light-to-heat conversion portions, and the plurality of light-to-heat conversion portions and the plurality of non-conversion portions are small in size.

30. An apparatus according to claim 29, wherein said plurality of light-to-heat conversion portions and said plurality of non-conversion portions are alternately arranged at predetermined intervals.

31. An apparatus according to claim 21, further comprising,
   a transparent conductive film which is arranged on one side of the ferromagnetic member, and
   a bias-voltage application unit which applies a bias voltage to the ferroelectric member through the transparent conductive film.

32. An apparatus according to claim 31, wherein said transparent conductive film includes a plurality of conductive portions and a plurality of non-conductive portions intermingled with the plurality of conductive portions, and the plurality of conductive portions and the plurality of non-conductive portions are small in size.

33. An apparatus according to claim 32, wherein said plurality of conductive portions and said plurality of non-conductive portions are alternately arranged at predetermined intervals.

34. An apparatus according to claim 31, wherein said transparent conductive film is transparent to infrared light.

35. An apparatus according to claim 21, wherein said contrast production member is constituted by a base in which charged particles are dispersed.

36. The apparatus according to claim 35, wherein said charged particles are attracted to an area in said contrast production member corresponding to said polarization inversion pattern of said ferroelectric member to produce said image contrast.

37. An apparatus according to claim 21, wherein said contrast production member is made of an electrochromic material.

38. An apparatus according to claim 21, wherein said ferroelectric member is made of an inorganic ferroelectric oxide.

39. An apparatus according to claim 38, wherein said ferroelectric member has a form of a thin film, and said inorganic ferroelectric oxide is made from metal alkoxides.

40. An apparatus according to claim 38, wherein said inorganic ferroelectric oxide is $LiNb_xTa_{1-x}O_3$, where $0 \leq x \leq 1$.

41. An image display medium for use in displaying an image, comprising:
   a ferroelectric member in which a polarization inversion pattern is produced in accordance with image information so as to produce a surface charge pattern corresponding to the polarization inversion pattern; and
   a contrast production member which is joined to said ferroelectric member, and in which an image contrast is produced by an influence of the surface charge pattern.

42. An image display medium according to claim 41, wherein said ferroelectric member is doped with a dopant which absorbs said infrared light.

43. An image display medium according to claim 42, wherein said dopant contains at least one of Mg, Ti, Cr, Ni, Cu, Zn, Zr, Nb, Mo, Rh, Ag, In, Sn, Au, and Pb.

44. An image display medium according to claim 41, further comprising a light-to-heat conversion member which has a form of a layer, is arranged in close proximity to or in contact with said ferroelectric member, absorbs said infrared light, and converts the infrared light into heat so that the heat is transferred to the ferroelectric member.

45. An image display medium according to claim 44, wherein said light-to-heat conversion member includes a plurality of light-to-heat conversion portions and a plurality of non-conversion portions intermingled with the plurality of small light-to-heat conversion portions, and the plurality of light-to-heat conversion portions and the plurality of non-conversion portions are small in size.

46. An image display medium according to claim 45, wherein said plurality of light-to-heat conversion portions and said plurality of non-conversion portions are alternately arranged at predetermined intervals.

47. An image display medium according to claim 44, wherein said image is constituted by three different color components,
   a plurality of light-to-heat conversion elements of each of three types are periodically arranged in a plurality of first predetermined positions in said light-to-heat conversion member, and selectively absorb one of three types of infrared light, and convert the one of the three types of infrared light into heat, and
   a plurality of color-formation elements of each of three types are periodically arranged in a plurality of second predetermined positions corresponding to said plurality of first predetermined positions in said contrast production member, and form a color for one of said three different color components.

48. An image display medium according to claim 41, wherein said ferroelectric member is made of an inorganic ferroelectric oxide.

49. An image display medium according to claim 48, wherein said ferroelectric member has a form of a thin film, and said inorganic ferroelectric oxide is made from metal alkoxides.

50. An image display medium according to claim 48, wherein said inorganic ferroelectric oxide is $LiNb_xTai_{1-x}O_3$, where $0 \leq x \leq 1$.

51. An image display medium according to claim 41, further comprising a transparent conductive film which is arranged on one side of the ferromagnetic member.

52. An image display medium according to claim 51, wherein said transparent conductive film includes a plurality of conductive portions and a plurality of non-conductive portions intermingled with the plurality of conductive portions, and the plurality of conductive portions and the plurality of non-conductive portions are small in size.

53. An image display medium according to claim 52, wherein said plurality of conductive portions and said plurality of non-conductive portions are alternately arranged at predetermined intervals.

54. An image display medium according to claim 51, wherein said transparent conductive film is transparent to infrared light.

55. An image display medium according to claim 41, wherein said contrast production member is constituted by a base in which charged particles are dispersed.

56. The image display medium according to claim 55, wherein said charged particles are attracted to an area in said contrast production member corresponding to said polarization inversion pattern of said ferroelectric member to produce said image contrast.

57. An image display medium according to claim 41, wherein said contrast production electrochromic material.

58. An image display medium according to claim 41, further comprising a wavelength-selective transparent film, wherein said image is constituted by three different color components, a plurality of light-to-heat conversion elements of each of three types are periodically arranged in a plurality of first predetermined positions in said wavelength-selective transparent film, and are selectively transparent to one of three types of infrared light respectively having three different wavelengths, and a plurality of color-formation elements of each of three types are periodically arranged in a plurality of second predetermined positions corresponding to said plurality of first predetermined positions, in said contrast production member, and form a color for one of said three different color components.

* * * * *